United States Patent
Long et al.

(10) Patent No.: US 6,766,573 B2
(45) Date of Patent: Jul. 27, 2004

(54) ELECTRIC MOTOR BONDING APPARATUS

(75) Inventors: Norman R. Long, Tipp City, OH (US); Chih M. Lin, Tipp City, OH (US); William J. Watkins, Tipp City, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 10/371,559

(22) Filed: Feb. 21, 2003

(65) Prior Publication Data

US 2003/0131466 A1 Jul. 17, 2003

Related U.S. Application Data

(63) Continuation-in-part of application No. 09/989,043, filed on Nov. 20, 2001.

(51) Int. Cl.[7] .............................................. H02K 15/16
(52) U.S. Cl. ..................... 29/596; 29/525.01; 439/800; 439/778; 439/790; 439/781; 439/785
(58) Field of Search ..................... 29/596, 525, 525.01, 29/525.11, 525.02; 339/95; 310/89; 439/800, 790, 793, 810, 814, 781, 782, 785, 791, 809, 778

(56) References Cited

U.S. PATENT DOCUMENTS

| | | |
|---|---|---|
| 2,070,566 A | 2/1937 | Dobbs |
| 2,694,800 A | 11/1954 | Sunderhauf |
| 2,710,381 A | 6/1955 | Monson |
| 2,968,018 A | 1/1961 | Hubbell |
| 3,083,348 A | 3/1963 | Crowther |
| 3,238,496 A | 3/1966 | Crowther |
| 3,492,625 A * | 1/1970 | Bromberg ............... 439/100 |
| 3,624,588 A | 11/1971 | Farmer |
| 3,657,683 A | 4/1972 | Grieshaber |
| 3,728,468 A | 4/1973 | Grauer |
| 3,786,398 A | 1/1974 | Snider |
| 4,057,312 A | 11/1977 | Hagermo |
| 4,060,305 A | 11/1977 | Poliak et al. |
| 4,632,491 A | 12/1986 | Lutz |
| 4,722,701 A | 2/1988 | Bradt |
| 4,810,207 A | 3/1989 | Butterfield |
| 4,913,666 A | 4/1990 | Murphy |
| 4,917,615 A | 4/1990 | Franks, Jr. |
| 4,953,285 A | 9/1990 | Fisher |
| 4,960,964 A | 10/1990 | Schnell et al. |
| 5,281,761 A * | 1/1994 | Woo et al. ............... 174/78 |
| 5,535,503 A | 7/1996 | Newman |
| 5,596,237 A | 1/1997 | Daniels |
| 6,040,646 A | 3/2000 | Peters |
| 6,142,836 A | 11/2000 | Deckmann et al. |
| 6,261,040 B1 | 7/2001 | Reynolds et al. |
| 6,361,382 B1 | 3/2002 | Yamada et al. |
| 6,388,216 B1 | 5/2002 | Puhalla et al. |

* cited by examiner

*Primary Examiner*—I Cuda Rosenbaum
*Assistant Examiner*—Stephen Kenny
(74) *Attorney, Agent, or Firm*—Michael Best & Friedrich LLP

(57) ABSTRACT

An electric motor having an integrally formed bonding apparatus that allows an installer to quickly and efficiently bond the electric motor to a bonding grid of a bonding area. A fastener having a head is inserted into an aperture of the housing of the electric motor such that a bonding conductor is captured between the housing and the head. The bonding conductor is electrically coupled to the housing via direct contact between the bonding conductor and the housing and/or via indirect contact through the fastener. An integrally formed surface of the housing prevents the bonding conductor from moving out from under the head.

20 Claims, 26 Drawing Sheets

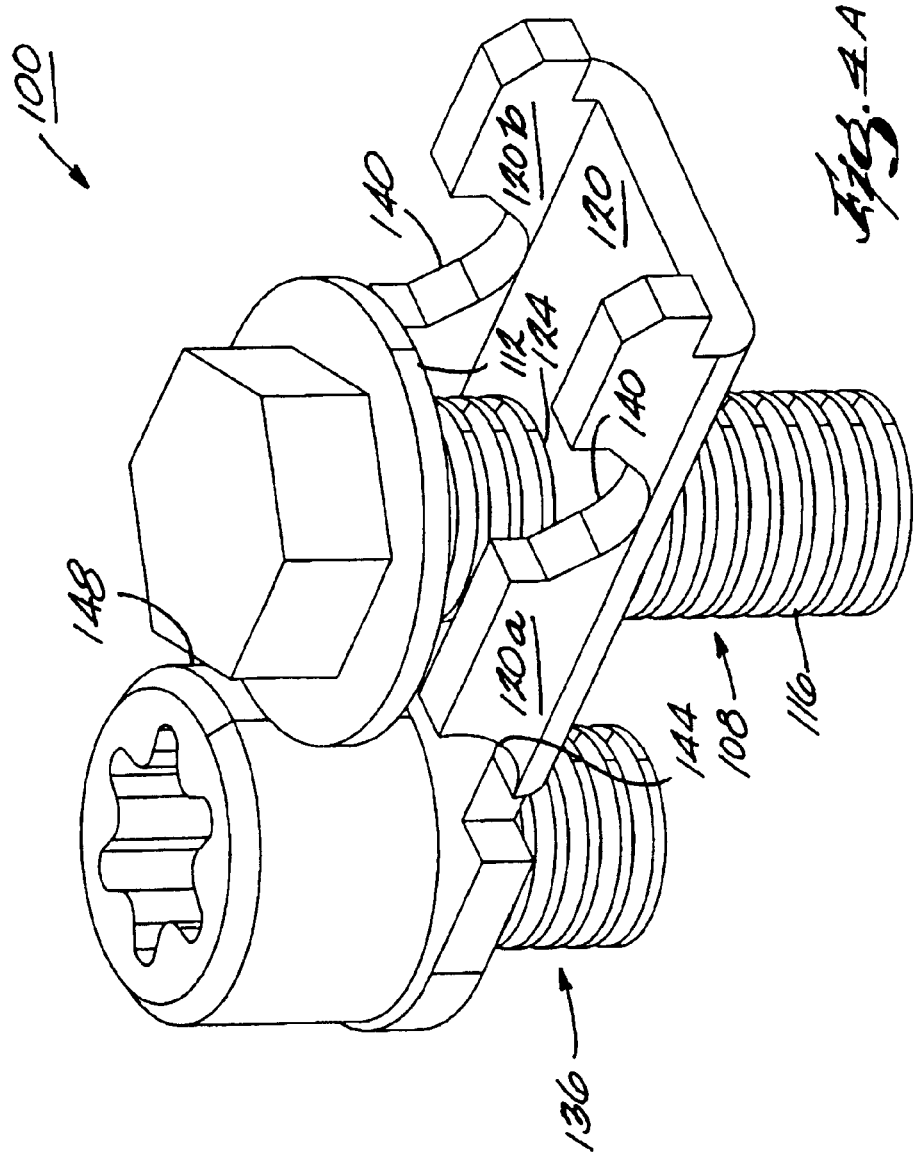

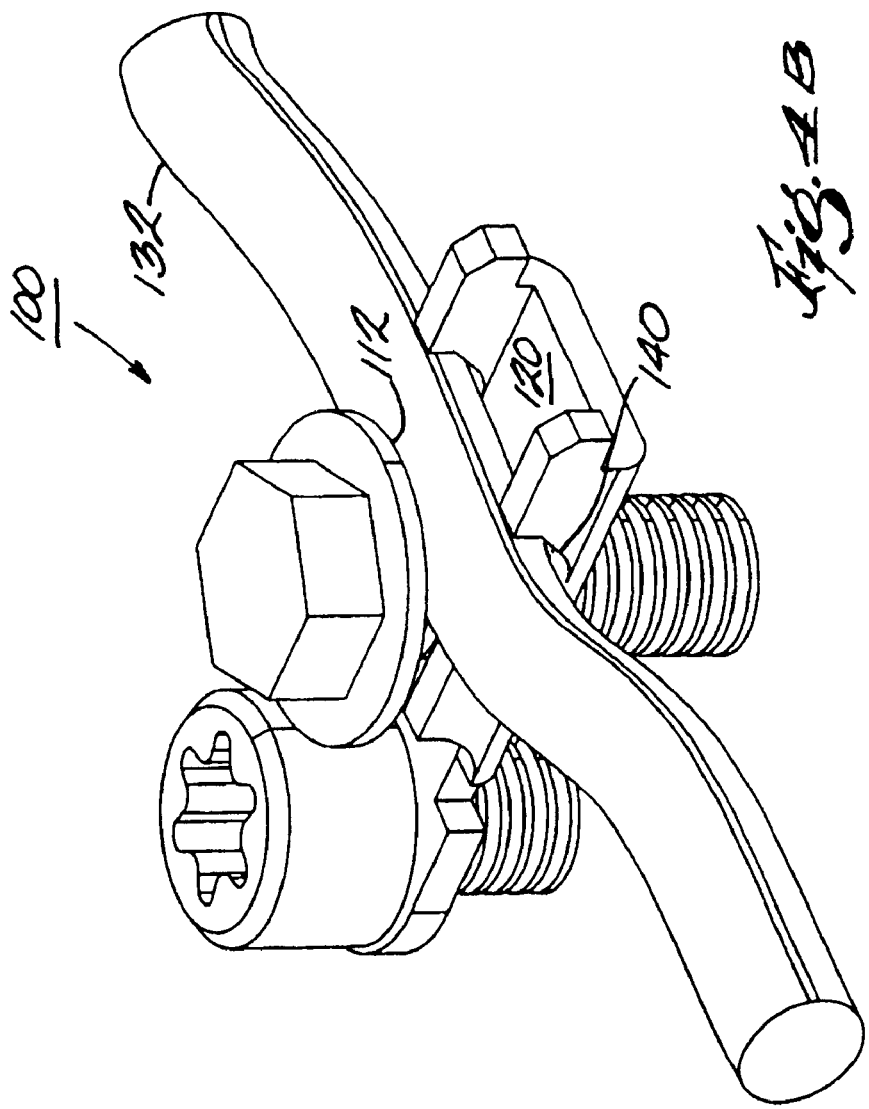

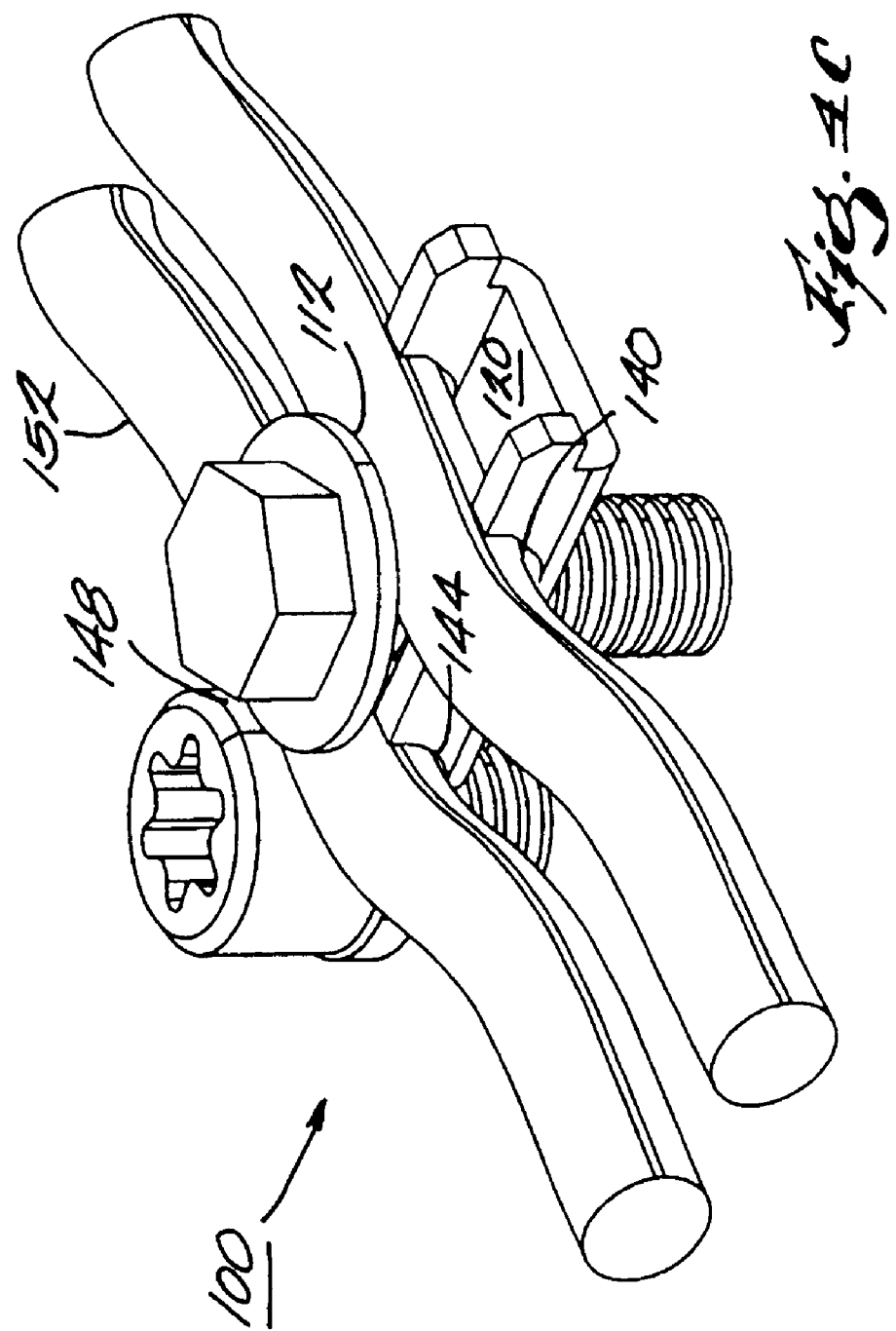

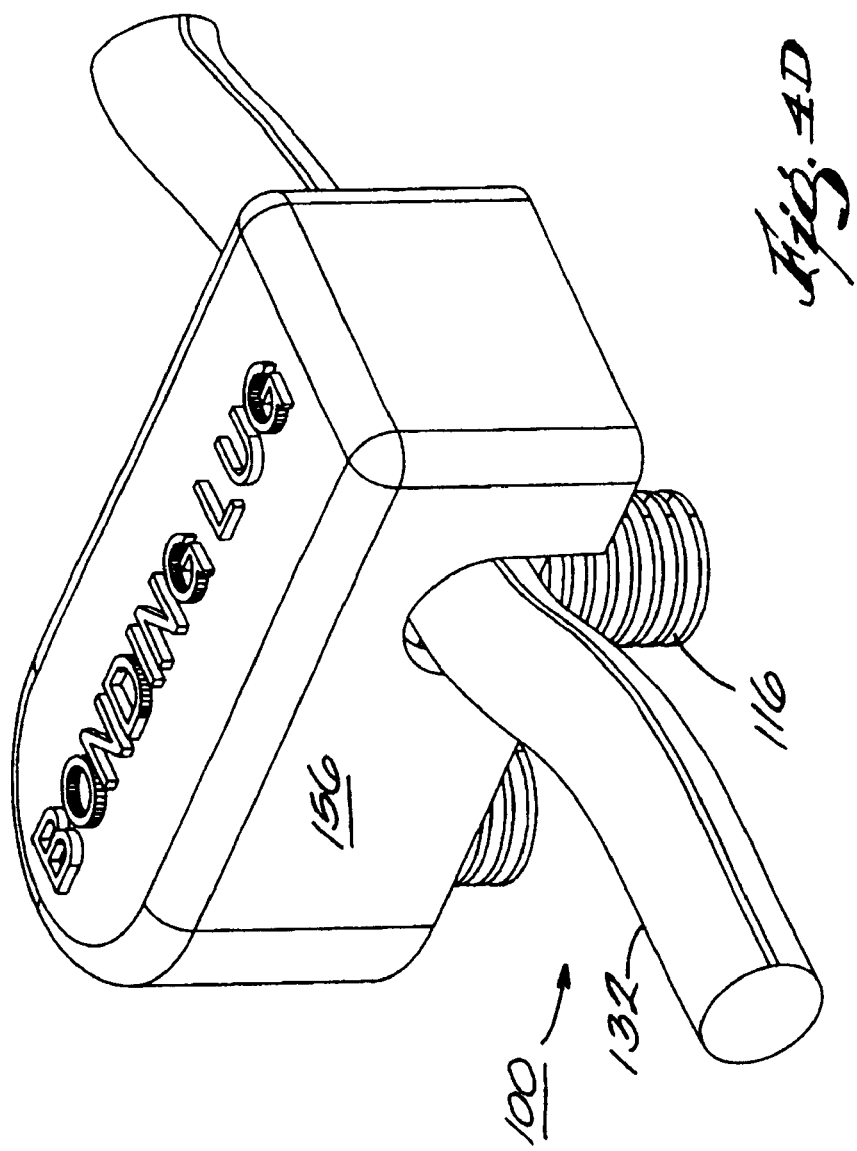

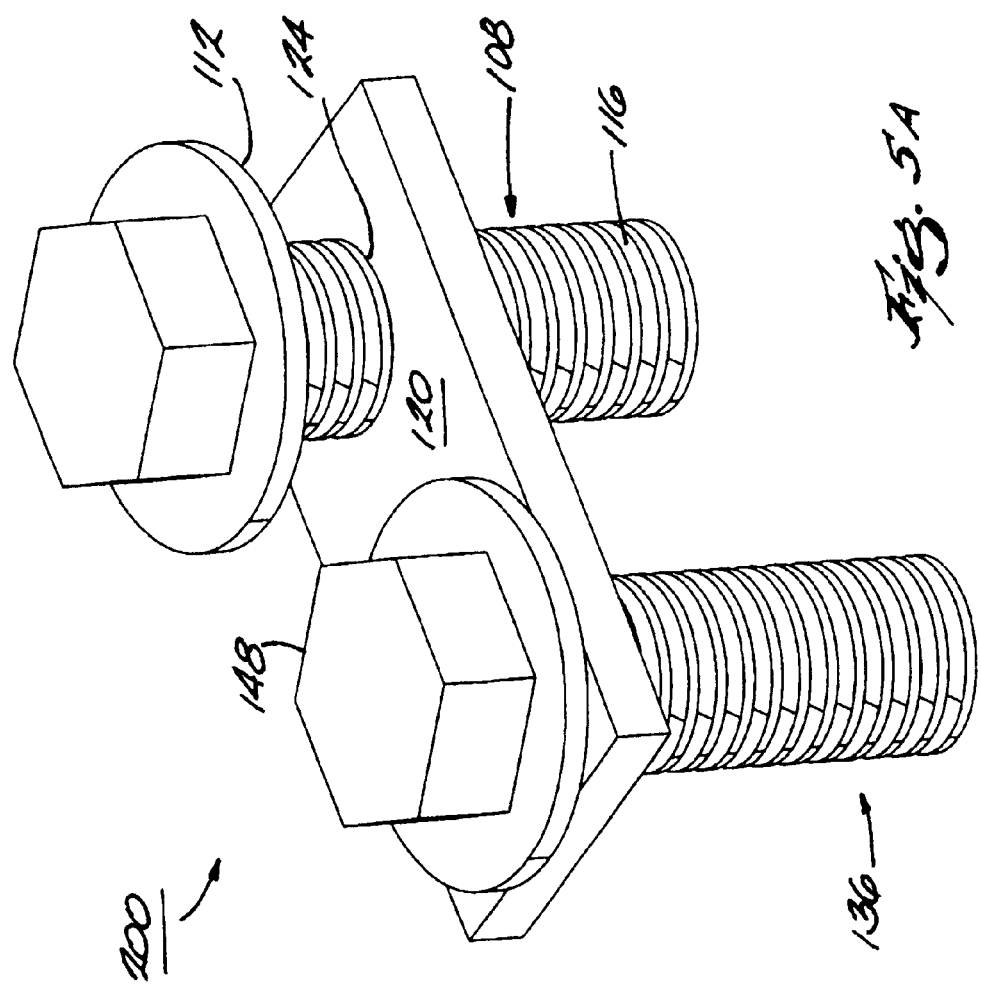

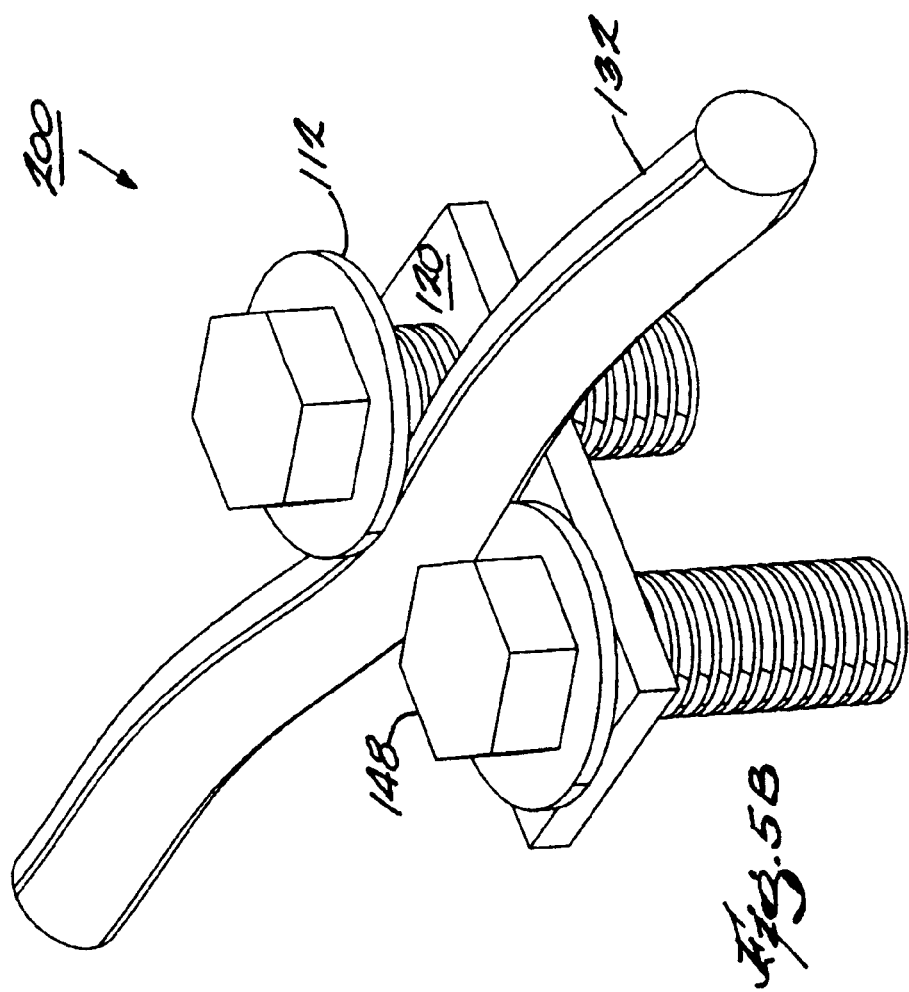

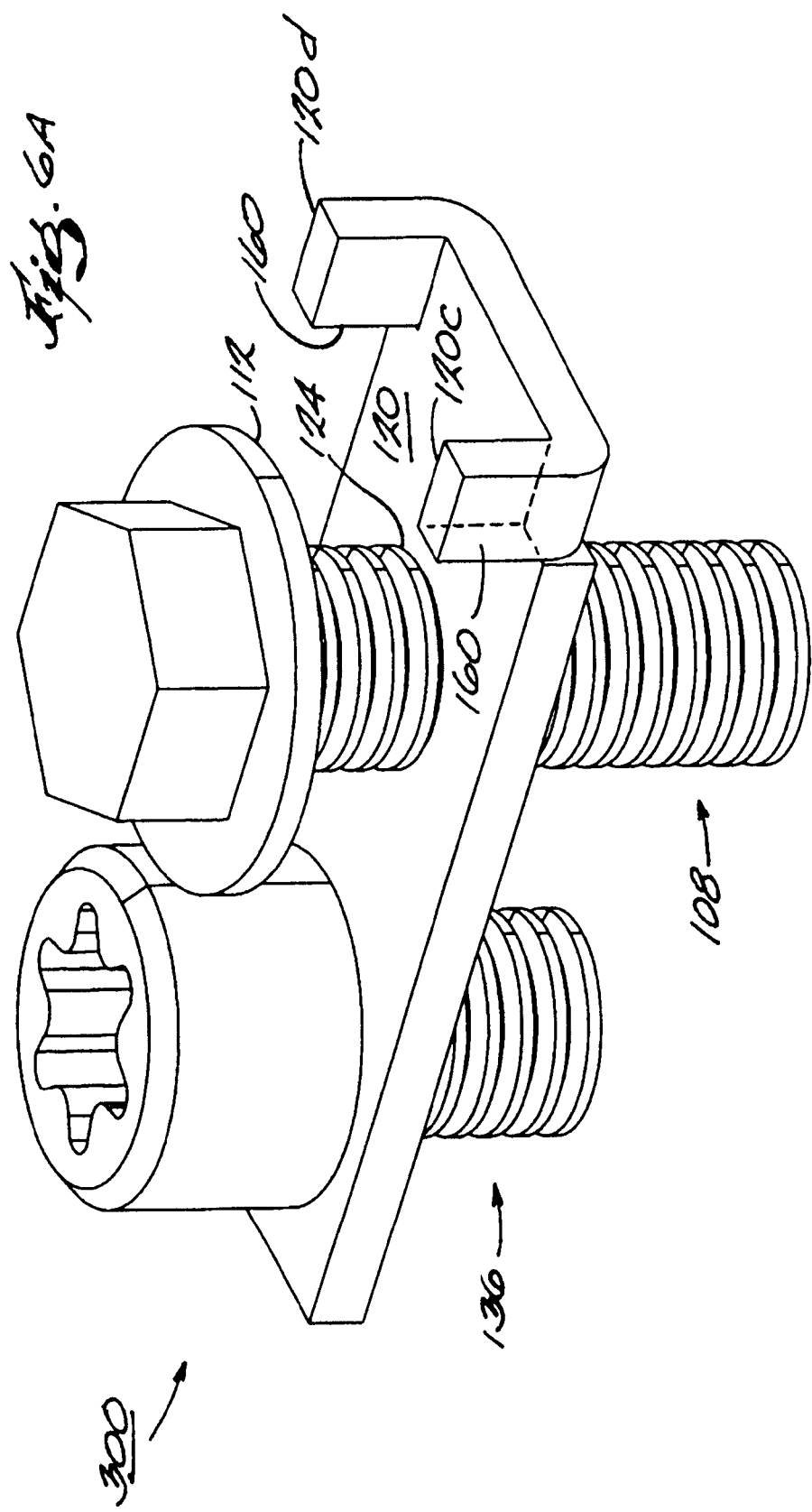

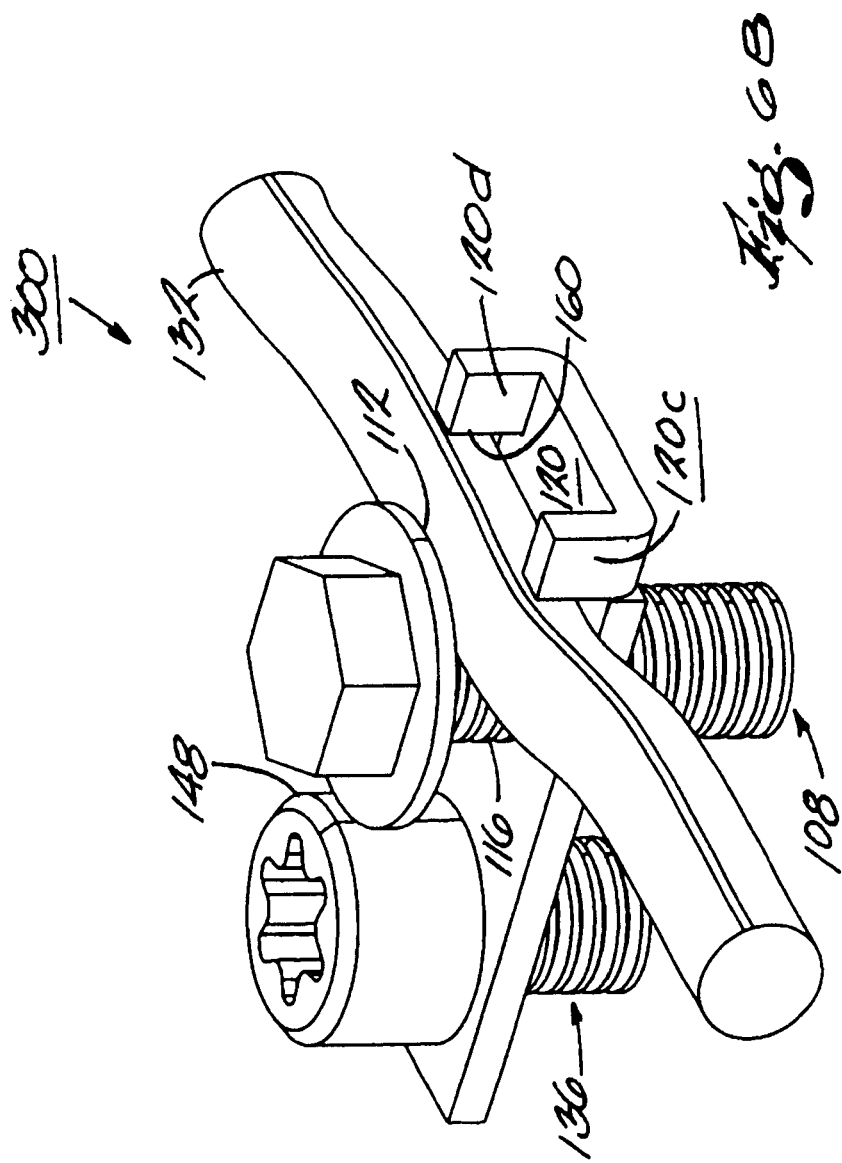

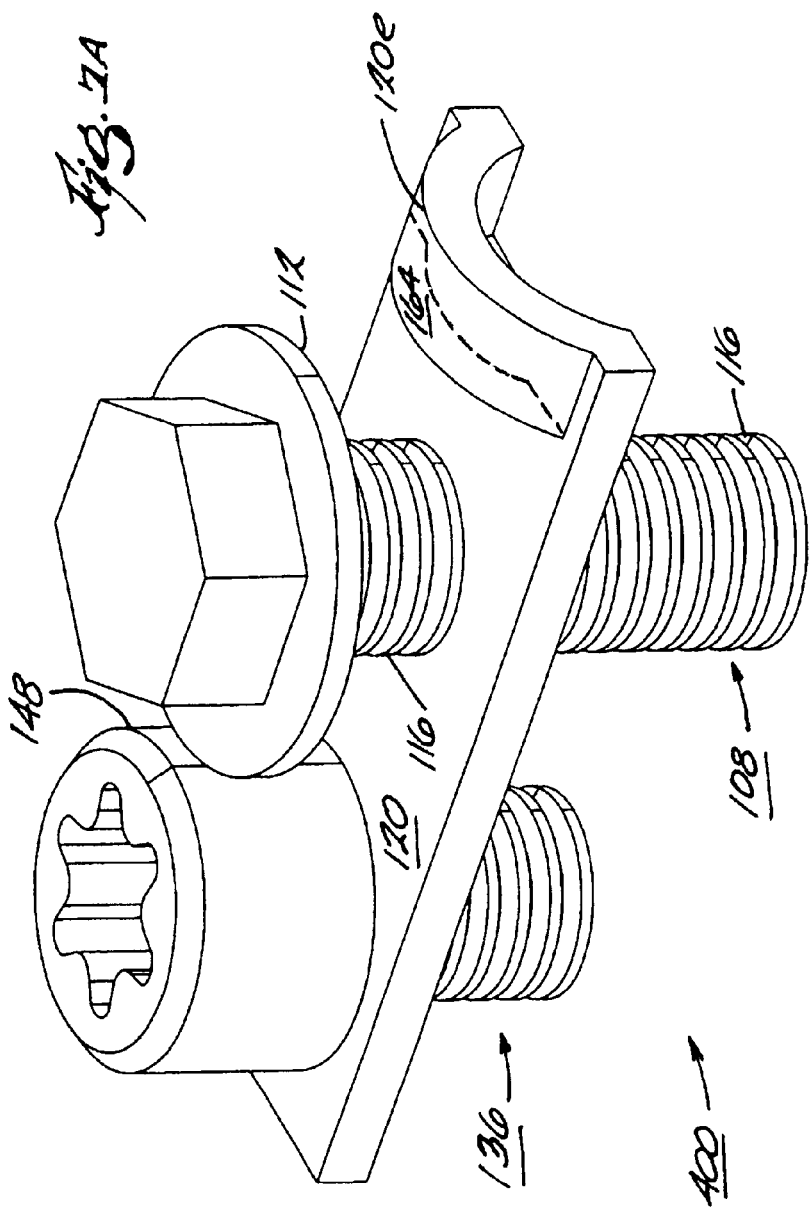

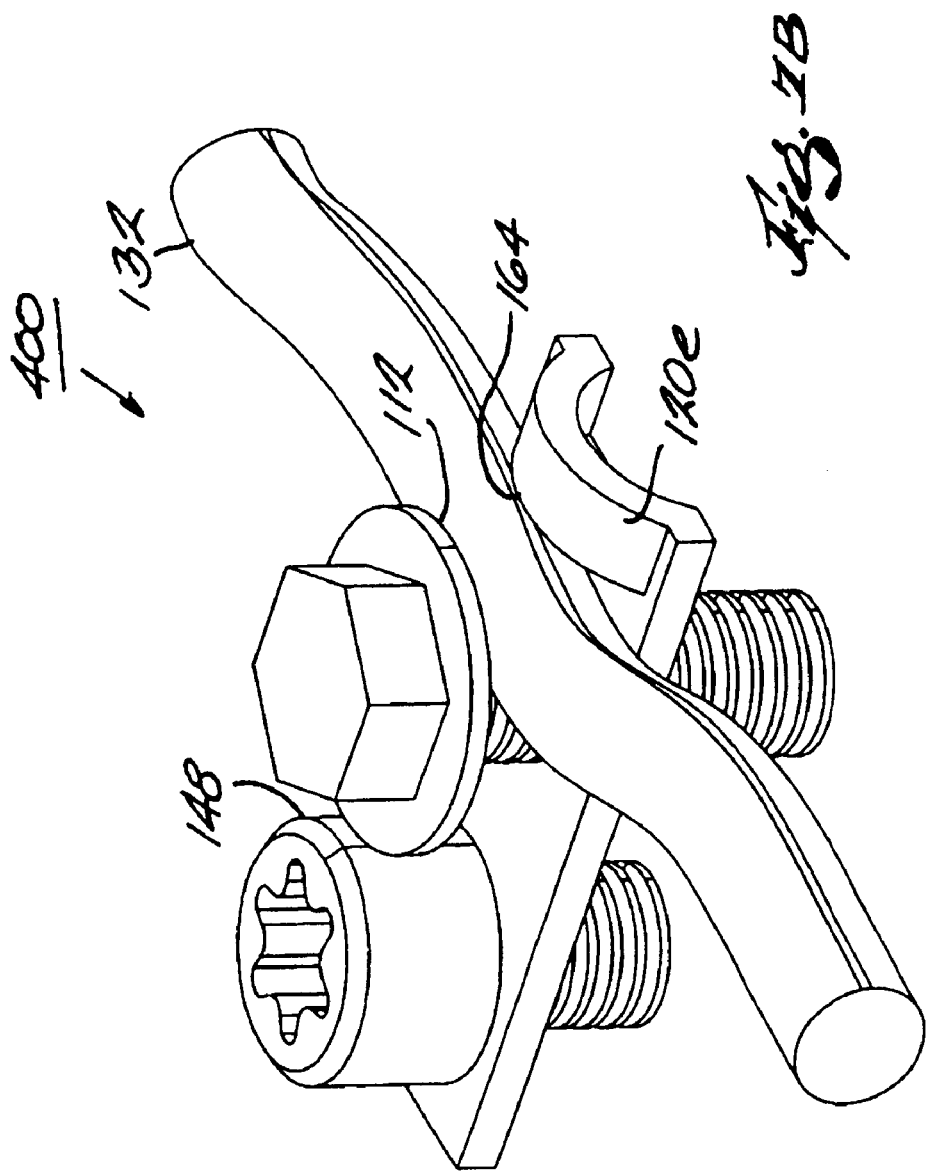

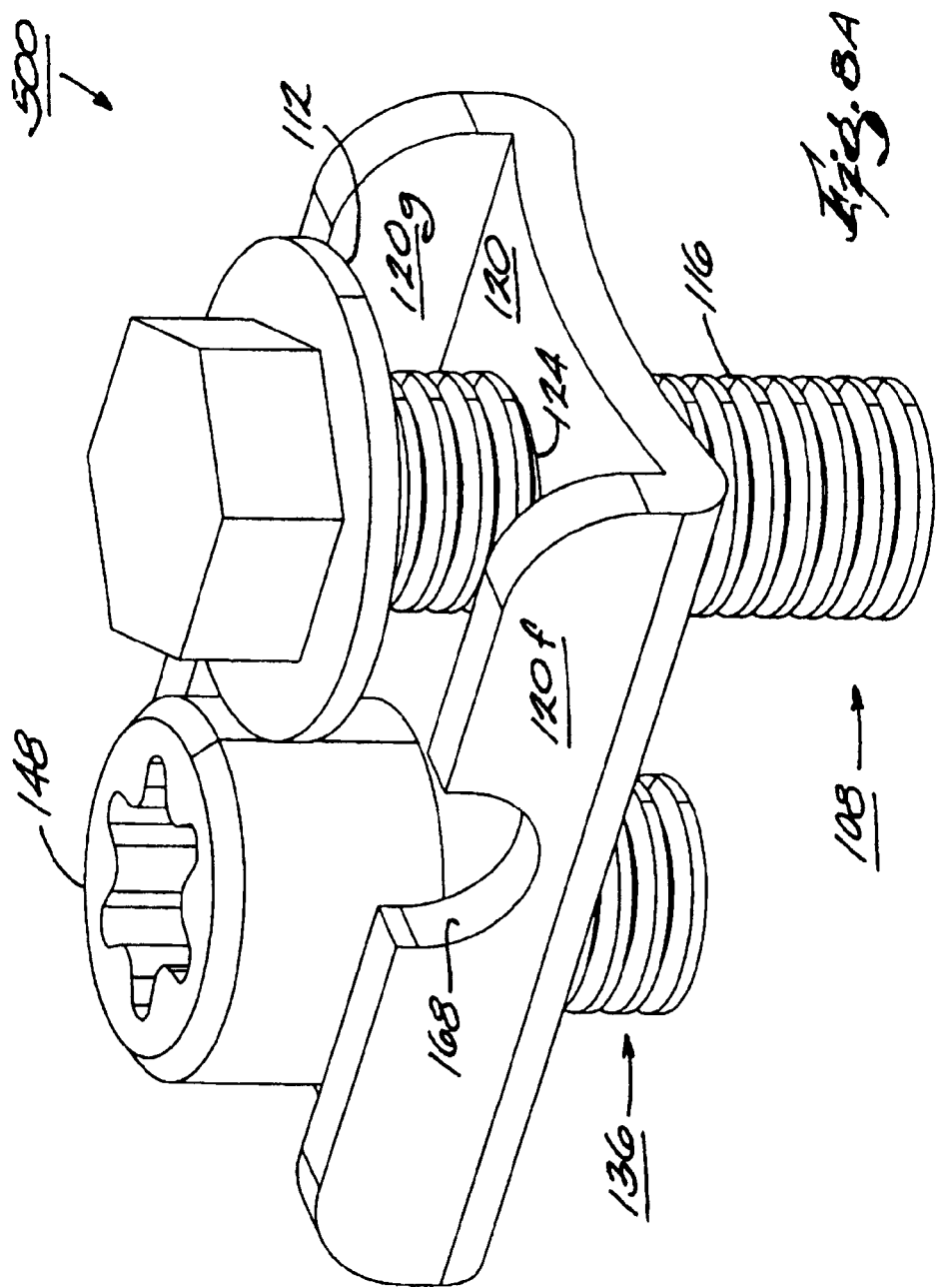

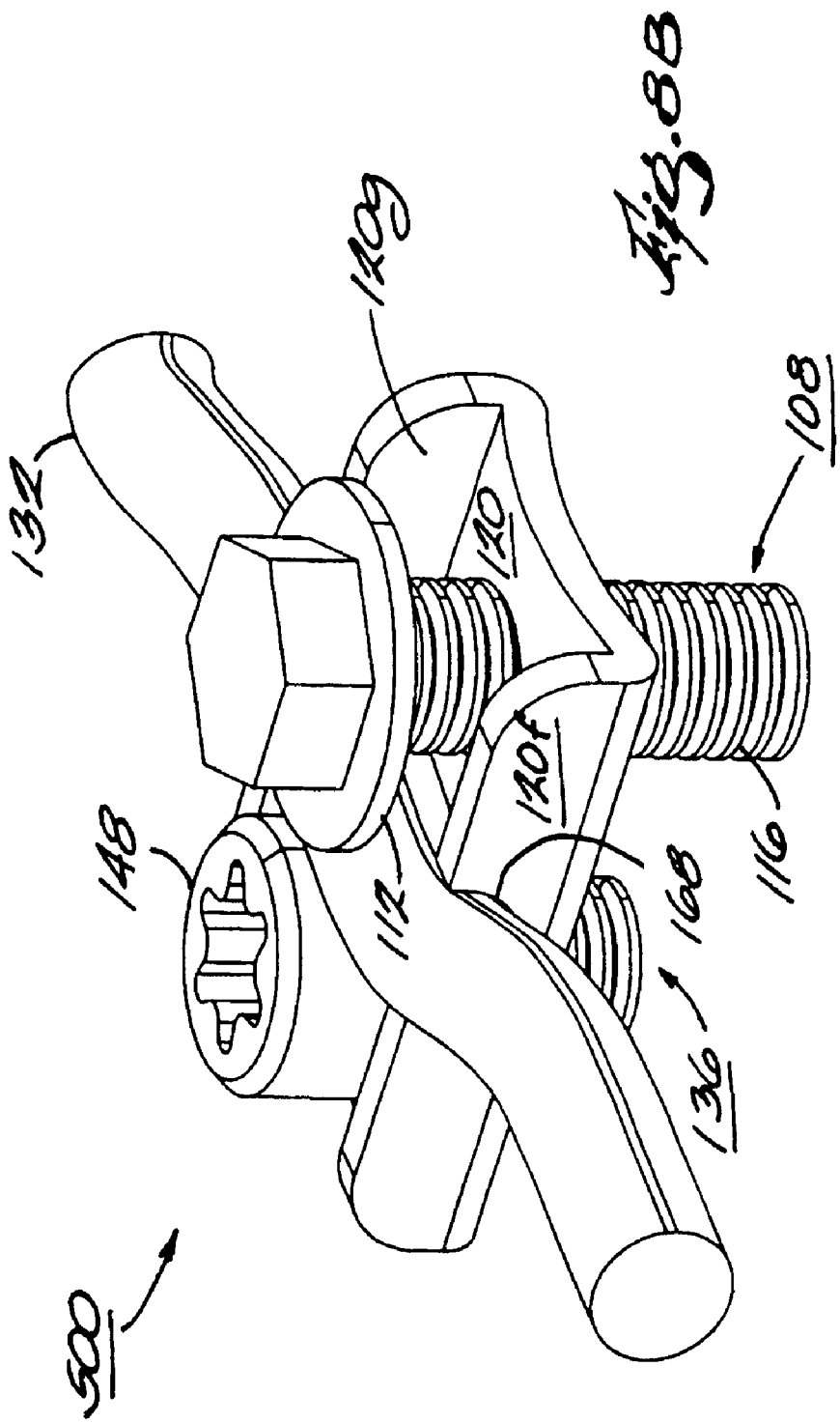

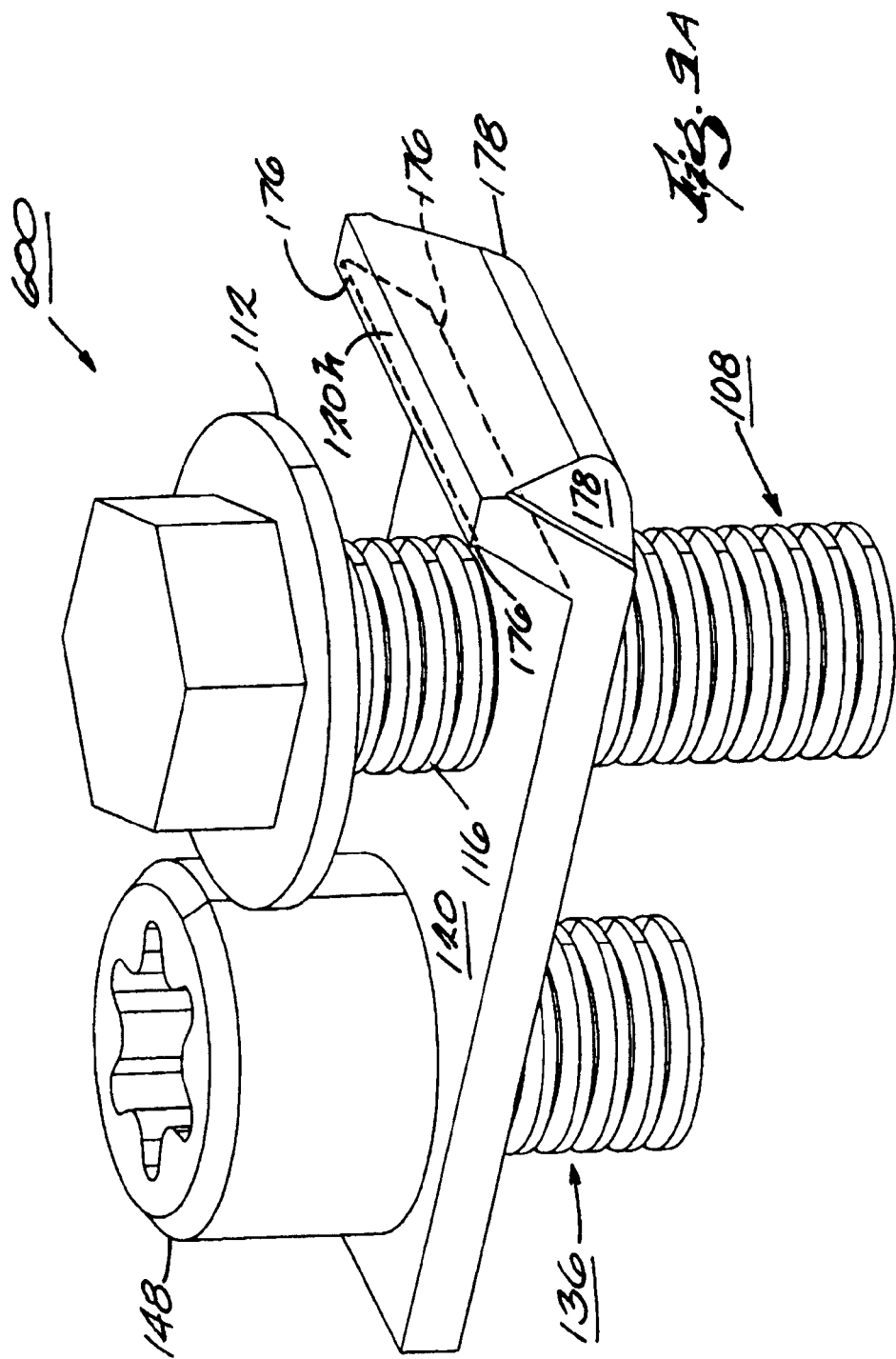

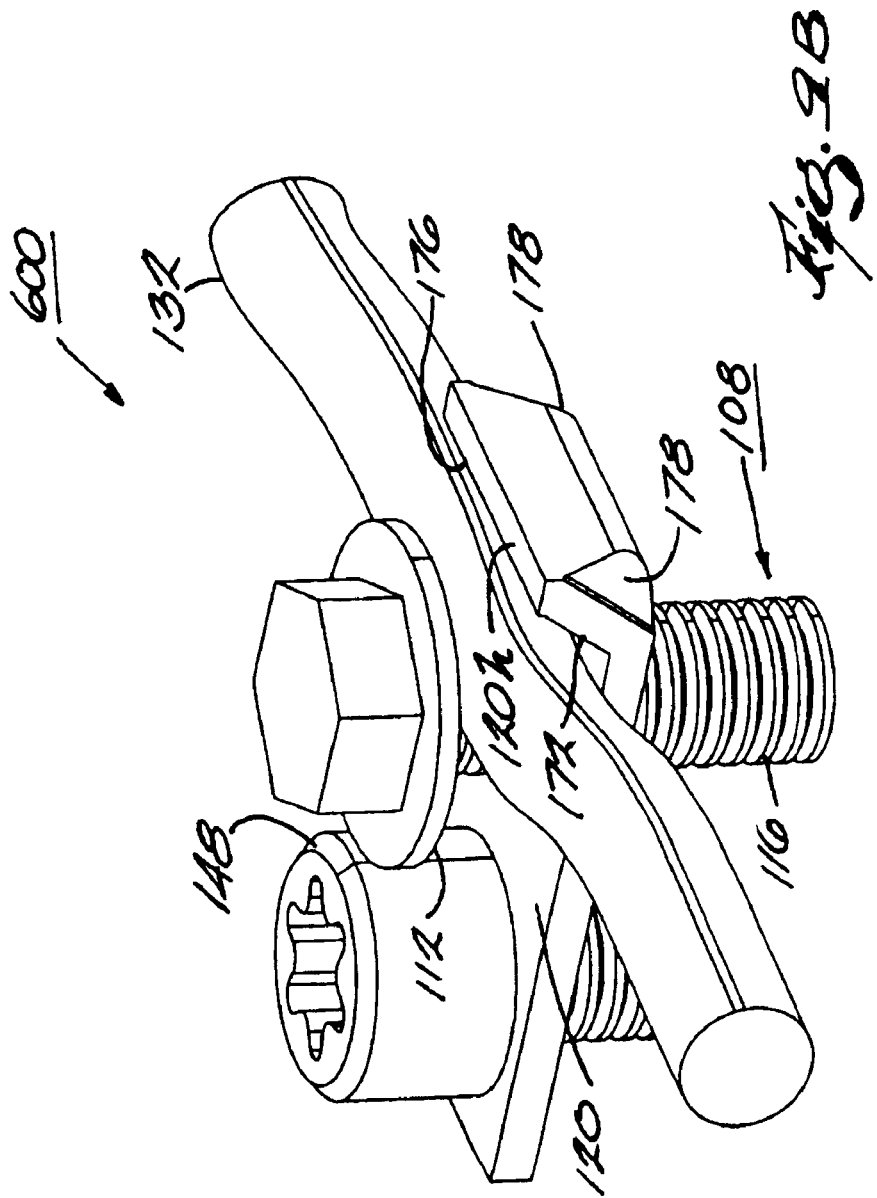

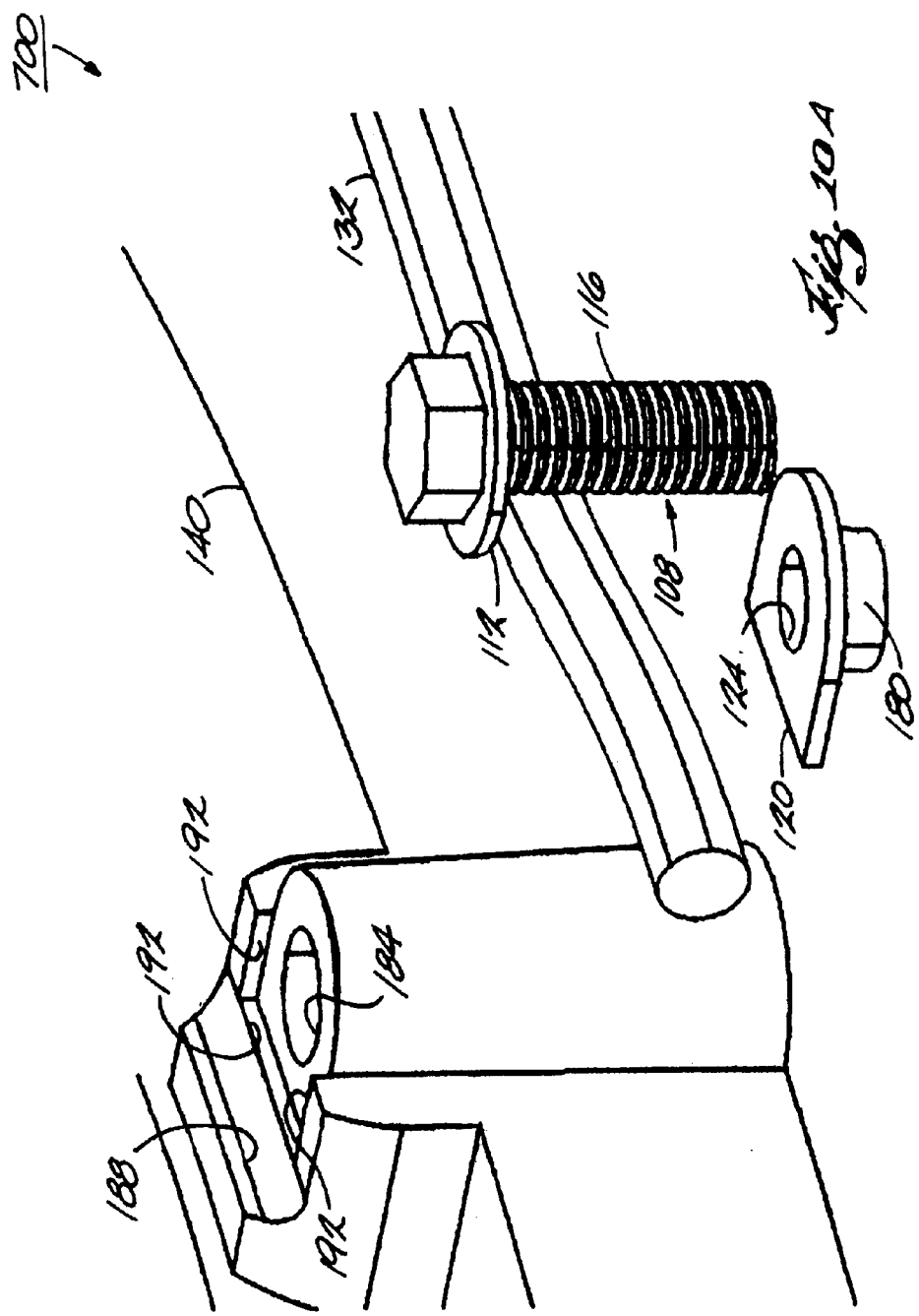

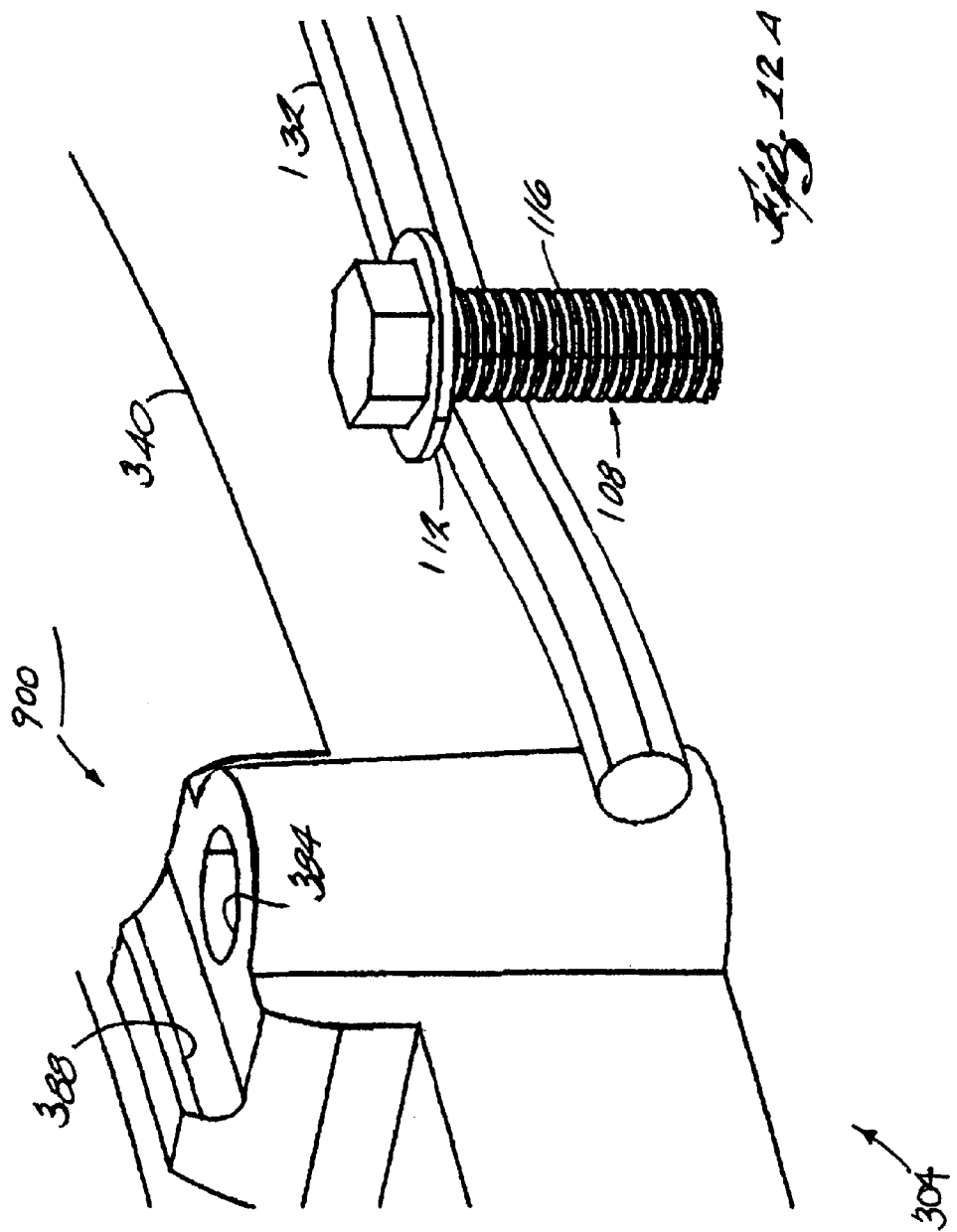

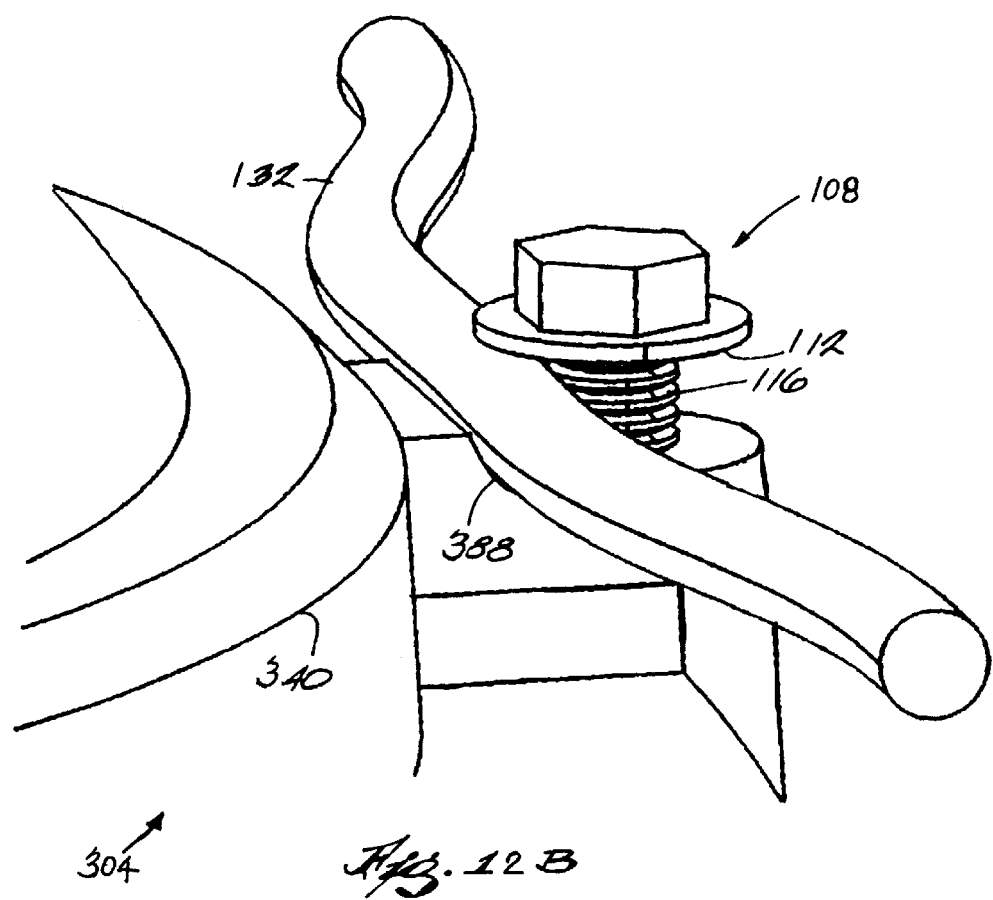

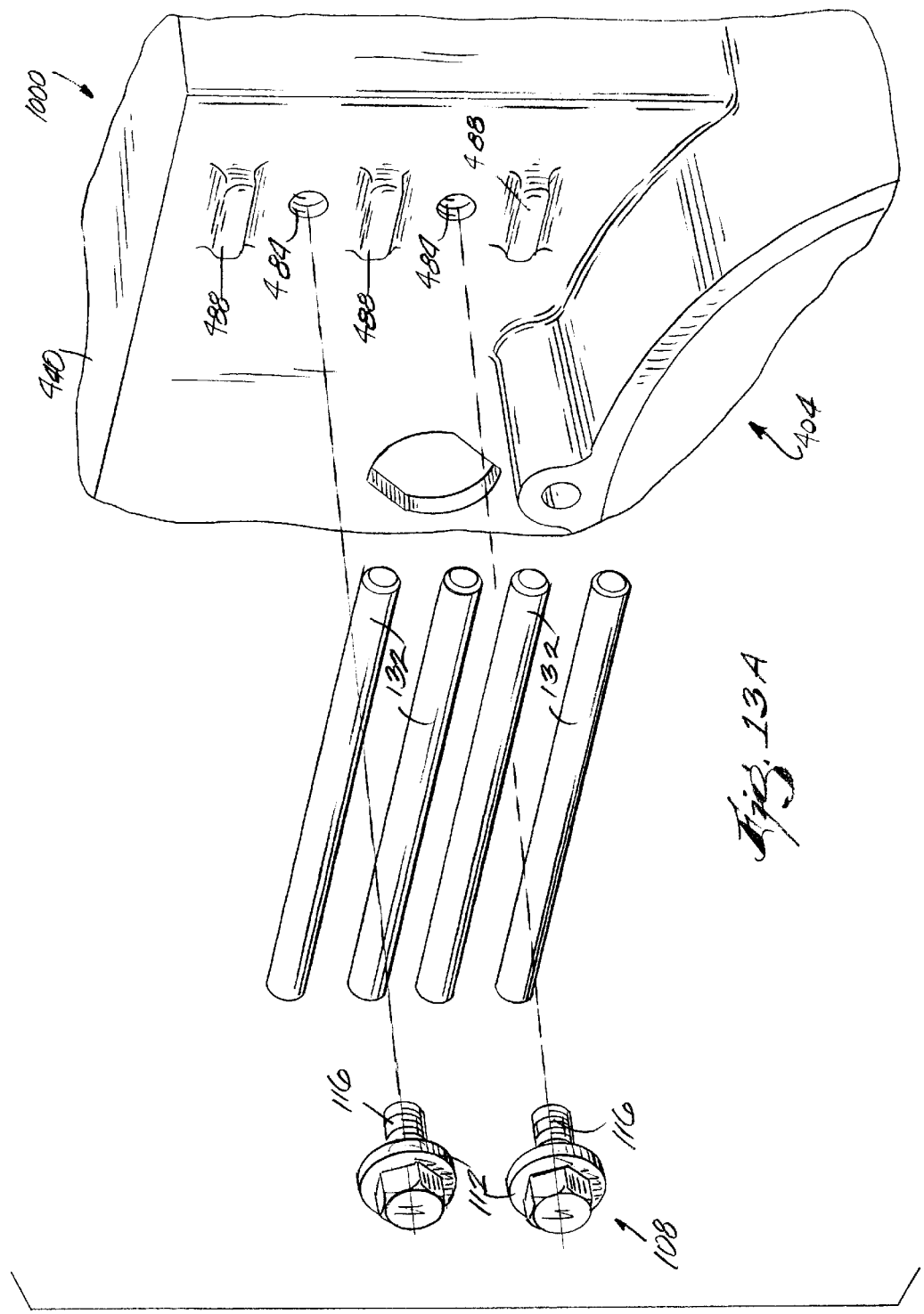

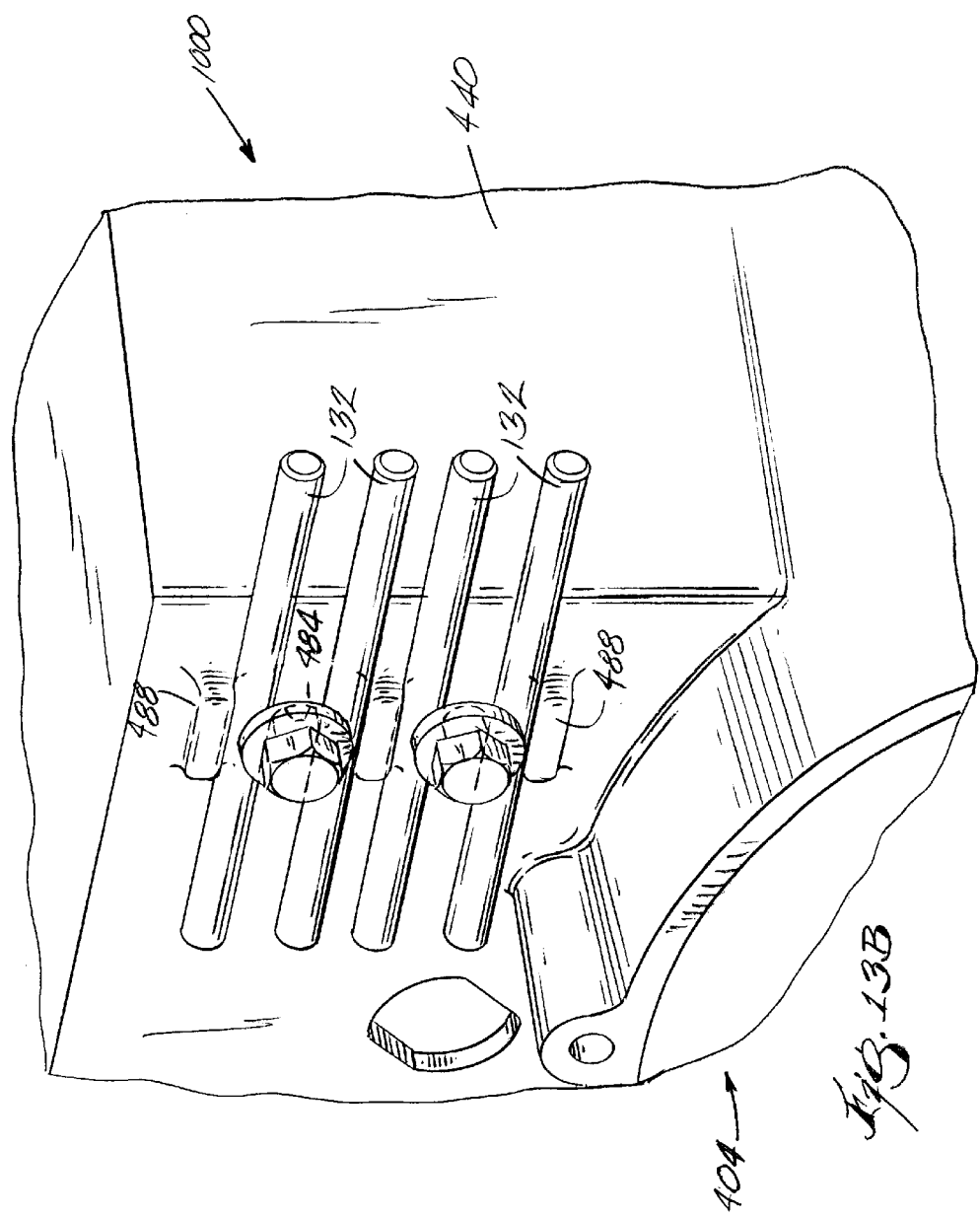

ELECTRIC MOTOR BONDING APPARATUS

CROSS REFERENCE TO RELATED APPLICATIONS

This application is a continuation-in-part of U.S. application Ser. No. 09/989,043, filed Nov. 20, 2001, the entire contents of which are incorporated by reference herein.

BACKGROUND OF THE INVENTION

The present invention relates to electric motors, and more particularly to bonding apparatus for electric motors.

Permanent installation of hydromassage bathtubs and equipment associated with the hydromassage bathtubs (e.g., recirculating pumps, lights, heaters, controls, air blowers) generally requires compliance with a number of installation standards. The installation standards may include standards such as those provided by National Electric Code ("NEC") (e.g., NEC Article 680), Underwriters Laboratories, Inc. ("UL") (e.g., UL Standard 1795) and local authorities (e.g., municipal statutes that are often based on the national standards provided by NEC and UL). Standards relating to bonding often require that devices or conductive materials (e.g., metal) located within a distance of the hydromassage bathtub or other devices that are covered by the standards (i.e., in the bonding area) be bonded together to form a bonding grid of the bonding area.

The purpose of forming a bonding grid is to eliminate the potential for an electrical energy differential (i.e., shock hazard) in the bonding area. The bonding grid acts as a path of less resistance than does the path of resistance provided by a human and/or an animal (e.g., cat or dog) located in the bonding area. Any stray electrical energy inside the bonding area is therefore conducted through the bonding grid instead of through the human and/or the animal located in the bonding area.

Bonding apparatus for bonding an electric motor to a bonding grid are generally known. Typically, the bonding apparatus bonds the electric motor to a bonding conductor which is part of the bonding grid. The bonding conductor includes a solid eight (or larger) gauge bare copper wire. The conductor generally does not require use of insulation or a conduit because the conductor does not carry electrical energy under normal operating conditions (i.e., the bonding conductor is only utilized when an electrical energy differential is present in the bonding area). Existing bonding apparatus, such as a bonding lug apparatus 10 illustrated in FIGS. 1A–B and 2A–C, require that a bonding conductor 14 be passed through an aperture 18 in a bonding lug 20 and then bonded to the bonding lug 20 by tightening a threaded fastener or screw 22 down upon the conductor 14 such that the conductor 14 is captured between the bonding lug 20 and the bottom 26 of the screw 22. The screw 22 is threaded into an aperture or opening 28 in the lug 20. Existing bonding apparatus are commonly formed of copper or copper alloy.

As is illustrated in FIGS. 2A–C, the bonding lug 20 may be connected to an electric motor 34 on the housing 38 of the motor 34 using a threaded fastener or screw 42. When properly installed, the conductor 14 is electrically coupled to the bonding lug 20 and the bonding lug 20 is electrically coupled to the housing 38. Generally an adequate electrical coupling is formed between the conductor 14 and the bonding lug 20. The electrical coupling may be formed via direct contact between the conductor 14 and the bonding lug 20 and/or via indirect contact through the screw 22. The screw 22 is formed of an electrically conductive material and when the screw 22 is tightened down on the conductor 14 an electrical coupling is formed between the conductor 14 and the screw 22. The screw 22 is electrically coupled to the bonding lug 20 through the interaction between the threads of the screw 22 and the corresponding threads in the aperture 28 of the bonding lug 20.

The contact between the bottom of the bonding lug 20 and the housing 38 may provide some degree of electrical coupling, however, the contacting surfaces of the bonding lug 20 and/or the housing 38 may include paint and/or other contamination that can diminish such electrical coupling. The paint and/or other contamination may additionally affect the degree of electrical coupling between the screw 42 and the bonding lug 20 as well as the direct contact between the conductor 14 and the bonding lug 20 discussed above.

The screw 42 is utilized to electrically couple the bonding lug 20 to the housing 38. Typically, the bonding lug 20 includes an aperture (not shown) through which the screw 42 passes and which is only a clearance aperture. Therefore, passing the screw 42 through the clearance aperture does not provide a reliable electrical coupling between the bonding lug 20 and the screw 42 (i.e., the threads of the screw 42 are not electrically coupled to the bonding lug 20 in a fashion similar to the way the threads of the screw 22 are electrically coupled to the corresponding threads of the aperture 40). If the screw 42 is not electrically coupled to the bonding lug 20 then the bonding lug 20 is likely not electrically coupled to the housing 38.

Accordingly, existing bonding lug apparatus (such as the bonding lug apparatus 10) utilize at least one star washer (not shown) (e.g., a star washer located around the screw 42 between the head 50 of the screw 42 and the bonding lug 20 and/or a star washer located around the screw 42 between the bonding lug 20 and the housing 38). Alternatively, or in addition, the screw 42 can have a serrated head to provide an electrical coupling between the screw 42 and the bonding lug 20 and therefore between the bonding lug 20 and the housing 38. The threads of the screw 42 generally become electrically coupled to the housing 38 when threaded into the housing 38, therefore, the coupling that generally presents a problem is the coupling between the screw 42 and the bonding lug 20. The star washer located between the head 50 and the bonding lug 20 and the serrated head are both designed to increase the reliability of the electrical coupling between the bonding lug 20 and the screw 42. The star washer located between the bonding lug 20 and the housing 38 is designed to increase the reliability of the electrical coupling between the bonding lug 20 and the housing 38. Use of the above techniques typically results in a proper installation.

While installing a motor 34 in a bonding area, the efficiency of the installer is important. Currently, the amount of time it takes the installer to bond the motor 34 to the bonding grid (not shown) includes passing the conductor 14 through the aperture 18 and utilizing the above techniques to ensure all corresponding parts are electrically coupled as required. The installer may pass the entire length of the conductor 14 through the aperture 18 or the installer may cut the conductor 14, pass a portion of the conductor 14 through the aperture 18 and then reconnect the cut portions of the conductor 14 together to form a continuous electrically conductive path. Depending on the amount of time it takes to pass the conductor 14 through the aperture 18, reconnect the cut portions of the conductor 14, and/or perform extra electrical coupling steps, the bonding process may require unnecessary time and effort on the part of the installer.

SUMMARY OF THE INVENTION

The invention provides an electric motor having an integrally formed bonding apparatus that allows the installer to quickly and efficiently bond the electric motor to a bonding grid of a bonding area. The integrally formed bonding apparatus is electrically coupled to a bonding conductor of the bonding grid simply by laying the bonding conductor on the housing of the electric motor and tightening down a fastener such that the bonding conductor is captured between the housing and the shoulder of the fastener. The installer does not need to pass the bonding conductor through an aperture, cut and reconnect portions of the bonding conductor to bond the motor to the conductor, or connect a bonding lug to the housing of the electric motor. The speed at which the installer can bond the motor to the bonding grid using the invention saves the installer time and money.

More particularly, according to a method of the invention, a fastener having a head is inserted into an aperture of the housing of the electric motor such that a bonding conductor is captured between the housing and the head. The bonding conductor is electrically coupled to the housing via direct contact between the bonding conductor and the housing and/or via indirect contact through the fastener. An integrally formed surface of the housing prevents the bonding conductor from moving out from under the head.

Further objects of the present invention together with the organization and manner of operation thereof, will become apparent from the following detailed description of the invention when taken in conjunction with the accompanying drawings wherein like elements have like numerals throughout the drawings.

BRIEF DESCRIPTION OF THE DRAWINGS

FIGS. 2A–2C illustrate a prior art bonding lug apparatus connected to a representative electric motor.

FIG. 4A illustrates the bonding lug apparatus that is the first embodiment of the invention.

FIG. 4B illustrates the bonding lug apparatus of FIG. 4A electrically coupled to a bonding conductor.

FIG. 4C illustrates the bonding lug apparatus of FIG. 4B electrically coupled to two bonding conductors.

FIG. 4D illustrates the bonding lug apparatus of FIG. 4A electrically coupled to a bonding conductor and connected to a bonding lug apparatus cover.

FIG. 5A illustrates a bonding lug apparatus that is a second embodiment of the invention.

FIG. 5B illustrates the bonding lug apparatus of FIG. 5A electrically coupled to a bonding conductor.

FIG. 6A illustrates a bonding lug apparatus that is a third embodiment of the invention.

FIG. 6B illustrates the bonding lug apparatus of FIG. 6A electrically coupled to a bonding conductor.

FIG. 7A illustrates a bonding lug apparatus that is a fourth embodiment of the invention.

FIG. 7B illustrates the bonding lug apparatus of FIG. 7A electrically coupled to a bonding conductor.

FIG. 8A illustrates a bonding lug apparatus that is a fifth embodiment of the invention.

FIG. 8B illustrates the bonding lug apparatus of FIG. 8A electrically coupled to a bonding conductor.

FIG. 9A illustrates a bonding lug apparatus that is a sixth embodiment of the invention.

FIG. 9B illustrates the bonding lug apparatus of FIG. 9A electrically coupled to a bonding conductor.

FIG. 10A illustrates a bonding lug apparatus that is a seventh embodiment of the invention.

FIG. 12A illustrates an electric motor housing having an integrally formed bonding apparatus that is an ninth embodiment of the invention.

FIG. 12B illustrates a bonding conductor electrically coupled to the integrally formed bonding apparatus of FIG. 12A.

FIG. 13A illustrates an electric motor housing having an integrally formed bonding apparatus that is a tenth embodiment of the invention.

FIG. 13B illustrates bonding conductors electrically coupled to the integrally formed bonding apparatus of FIG. 13A.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The use of "pool" and variations thereof herein is meant to encompass fluid-holding apparatus such as swimming pools, hot tubs, spas, and the like. The use of "hydromassage bathtub," "whirlpools," "jetted bathtubs," and variations thereof herein is meant to encompass drainable fluid-holding apparatus that include recirculating pumps for pumping fluid through fluid jets in the fluid-holding apparatus.

Figure 1A:
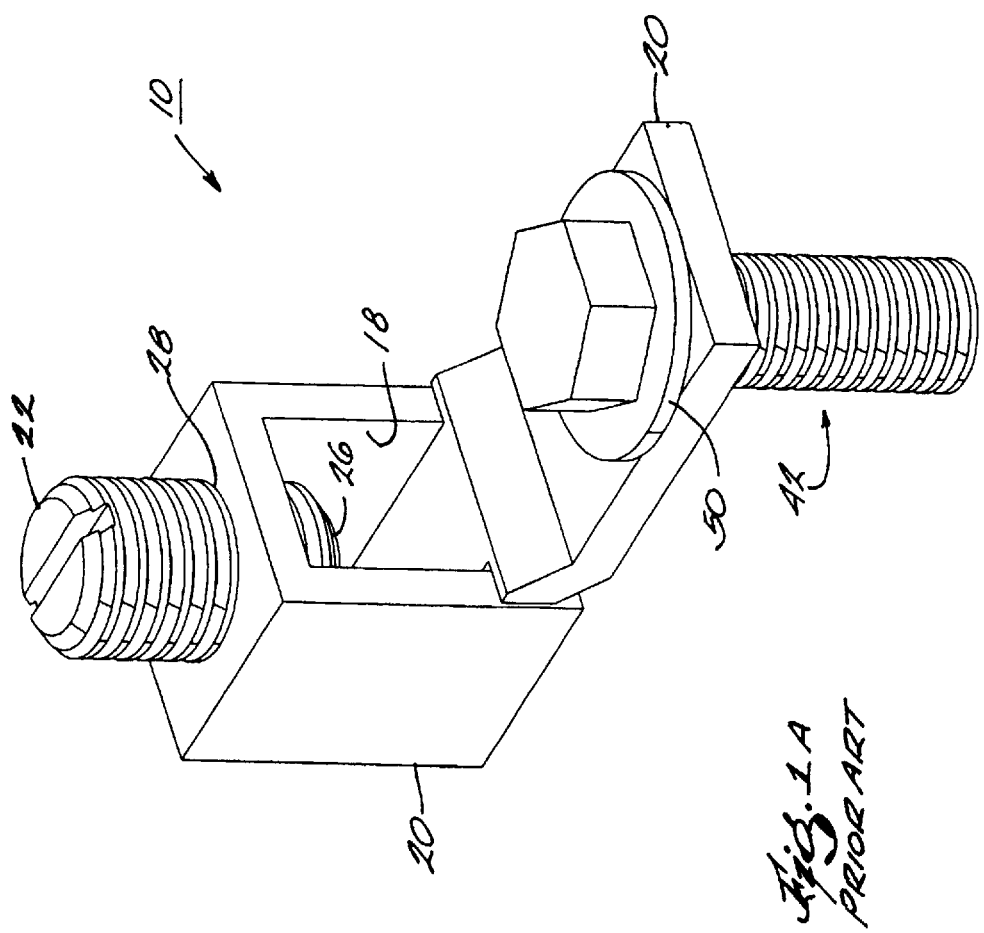
FIG. 1A illustrates a prior art bonding lug apparatus.
Figure 1B:
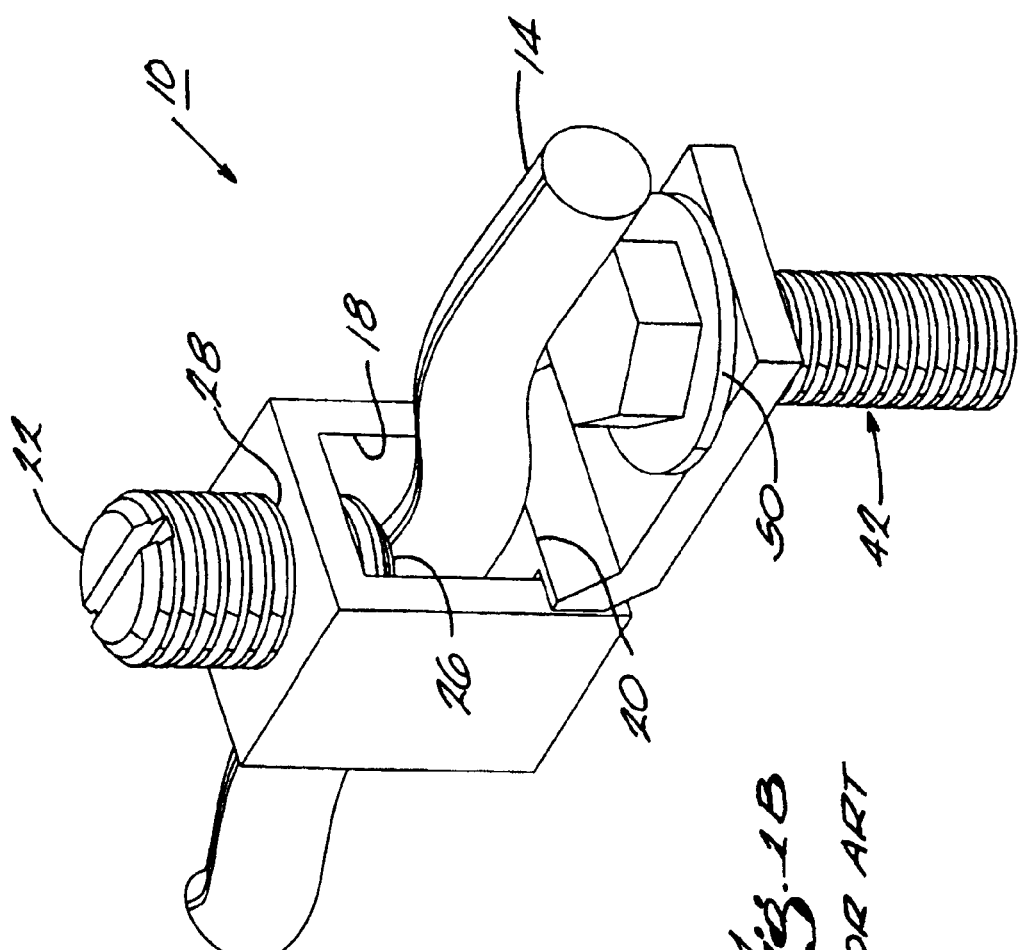
FIG. 1B illustrates a prior art bonding lug apparatus electrically coupled to a bonding conductor.
Figure 1A:
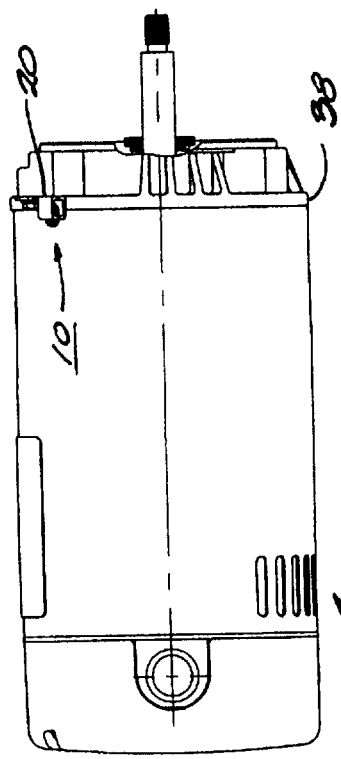
Figure 1C:
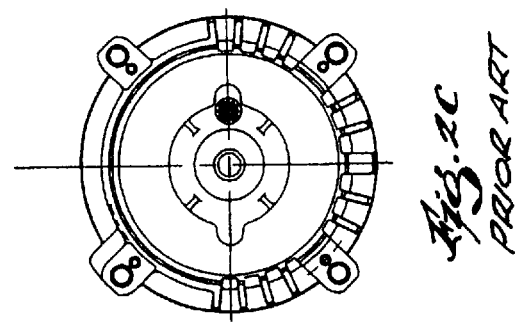
Figure 1B:
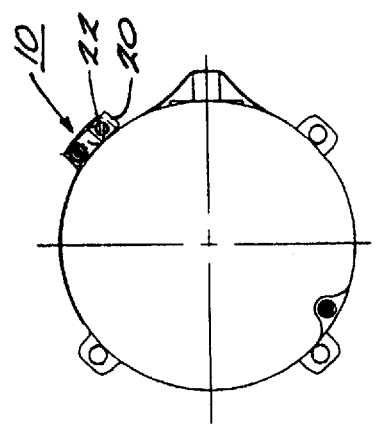
Figure 3A:
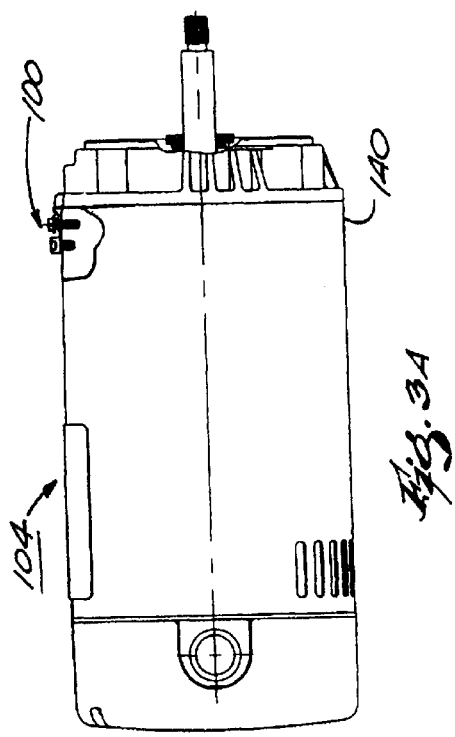
FIGS. 3A–3C illustrate a bonding lug apparatus that is a first embodiment of the invention electrically coupled to a representative electric motor.
Figure 3C:
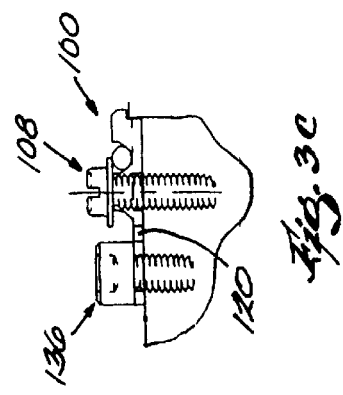
Figure 3B:
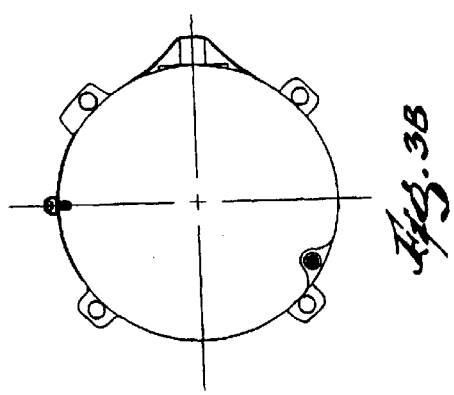

FIGS. 3A–C and 4A–D illustrate a bonding lug apparatus 100 that is a first embodiment of the invention electrically coupled to a representative electric motor 104. FIG. 3C illustrates an enlarged view of the breakaway section of FIG. 3A. It should be understood that the present invention is capable of use on other devices and the motor 104 is merely shown and described as an example of one such device. The illustrated motor 104 is drivingly connected to a pump (not shown) utilized to pump water into and/or out of a pool (not shown).

The apparatus 100 (see FIG. 4A) includes a fastener 108 having a head 112 and a shaft 116, and a bonding lug 120 having an aperture 124 that receives the fastener 108. The head 112 of the fastener 108 (and the heads of other fasteners having a head that are associated with the apparatus 100) may include any design (e.g., slotted, hex shaped, Phillips head, square head, round head, flat head, and the like). The head 112 may be designed such that an individual can quickly and conveniently install and/or maintain the apparatus 100. The head 112 preferably has a hex head, which is more reliable in a corrosive environment.

The shaft 116 of the fastener 108 (and the shafts other fasteners having shafts associated with the apparatus 100) may include any design (e.g., threaded, non-threaded, and the like). The shaft 116 may be removably connected to apertures corresponding to the shaft 116 or permanently connected to the apertures corresponding to the shaft 116. The shaft 116 preferably includes self-tapping threads such that a reliable electrical coupling is formed between the fastener 108 and each of the apertures receiving the shaft 116.

The bonding lug 120 is typically made of a copper or a copper alloy material. The aperture 124 of the bonding lug 120 (and the apertures corresponding to the shafts of the fasteners having shafts associated with the apparatus 100) may be sized to frictionally engage the shaft 116, threaded to receive the threads of the shaft 116, sized such that threads are produced in the aperture when the shaft 116 (including self-tapping threads) is received by the aperture, or otherwise sized to receive the shaft 116 (e.g., clearance aperture).

A bonding conductor 132 is captured between the head 112 and the bonding lug 120 when the fastener 108 is received in the aperture 124. The conductor 132 is typically a solid eight gauge (or larger) bare wire. The conductor 132 is generally captured between the head 112 and the bonding lug 120 without wrapping the conductor 132 around the fastener 108. Capturing the conductor 132 between the head 112 and the bonding lug 120 does not necessitate the conductor 132 be captured directly between the head 112 and the bonding lug 120. Other materials (e.g., electrically conductive materials) may be captured between the conductor 132 and the head 112 and/or the conductor 132 and the bonding lug 120 without interfering with the design of the invention (e.g., see discussion below with respect to FIGS. 5A and 5B).

A structure (discussed further below) is provided that prevents the conductor 132 from moving out from under the head 112. The structure may be included on any number of the bonding lug 120, the motor 104, fasteners associated with the apparatus 100, and the like. The structure may include any number of sub-structures. More than one structure may be provided if more than one bonding conductor is electrically coupled to the apparatus 100.

As best illustrated in FIG. 3C, the apparatus 100 includes a fastener 136. The bonding lug 120 is connected to the housing 140 of the motor 104 (i.e., to the motor 140) with the fastener 136. The housing 140 may include a sheet metal main frame of the motor 104, a sheet metal base of the motor 104, a first aluminum end frame of the motor 104, a second aluminum end frame of the motor 104, and the like. The fastener 136 preferably connects the bonding lug 120 to the housing 140 in a fashion such that the bonding lug 120 is electrically coupled to the housing 140. The fastener 136 (and other fasteners associated with the apparatus 100) may include a weld, a threaded fastener, a non-threaded fastener, an electrically conductive adhesive, a non-electrically conductive adhesive (preferably utilized in conjunction with a conductor that electrically couples the bonding lug 120 and the housing 140), and the like.

In the illustrated embodiments of the invention the bonding lug 120 is connected to the housing 140 with the fastener 108. In other embodiments the fastener 108 may not be utilized to connect the bonding lug 120 to the housing 140 (e.g., the fastener 108 may terminate in the aperture 124 of the bonding lug 120). If the fastener 108 is not utilized to connect the bonding lug 120 to the housing 140 then the aperture 124 is preferably designed such that the interaction between the shaft 116 and the aperture 124 provides a reliable electrical coupling between the bonding lug 120 and the conductor 132 (i.e., via indirect contact through the fastener 108). In other embodiments the interaction between the shaft 116 and the aperture 124 may not provide a reliable electrical coupling between the bonding lug 120 and the conductor 132 if a direct contact between the bonding lug 120 and the conductor 132 provides a reliable electrical coupling.

Generally, when the fastener 136 and the fastener 108 are utilized to connect the bonding lug 120 to the housing 140 the bonding lug 120 is prevented from rotating on the housing 140. If only a single fastener (e.g., the fastener 136) is utilized to connect the bonding lug 120 to the housing 140, the housing 138 may include a structure (e.g., see discussion below with respect to FIG. 10A) that prevents rotation of the bonding lug 120 on the housing 140.

The bonding lug 120 illustrated in FIGS. 4-C includes a pair of spaced tabs 120a and 120b formed and extending upwardly (in FIGS. 4A, 4B and 4C) in the direction of the head 112. The illustrated tabs 120a and 120b are formed normal to the primary plane of the bonding lug 120. Each tab 120a and 120b includes a surface 140 of a half-round cutout and a surface 144 of a quarter-round cutout. The surfaces 140 of the half-round cutouts act as the structure that prevents the conductor 132 from moving out from under the head 112. The surfaces 144 of the quarter-round cutouts in conjunction with a head 148 of the fastener 136 act as a second structure (similar to the structure) that prevents a second bonding conductor 132 from moving out from under the head 112. FIG. 4B illustrates the apparatus 100 electrically coupled to the conductor 132. FIG. 4C illustrates the apparatus 100 electrically coupled to the conductor 132 and a second bonding conductor 152 (i.e., the apparatus 100 acts to splice the conductor 132 and the conductor 152 together). The apparatus may be electrically coupled to the conductor 132 and/or the conductor 152. FIG. 4D illustrates the apparatus 100 electrically coupled to the conductor 132 with a bonding lug apparatus cover 156 connected to the apparatus 100. The cover 156 can be utilized to protect the apparatus 100 from environmental conditions and protect humans and animals from the surfaces of the apparatus 100. The cover 156 may employ other shapes and sizes in other embodiments. The shape and size employed may depend on the number of bonding conductors the apparatus 100 is electrically coupled to and the shape of the apparatus 100. The cover 156 may include alphanumeric characters, as illustrated in FIG. 4D, such as "BONDING LUG" to assist an individual in identifying the apparatus 100.

FIGS. 5A and 5B illustrate a bonding lug apparatus 200 that is a second embodiment of the invention. Elements in common with the apparatus 100 have the same reference numerals. The head 148 is configured to act as the structure that prevents the conductor 132 from moving out from under the head 112. FIG. 5B illustrates the apparatus 200 electrically coupled to the conductor 132. As is illustrated, the conductor 132 does not necessarily need to be captured directly between the head 112 and the bonding lug 120. The apparatus 200 captures the conductor 132 between the bottom side of the head 112 and the top side of the flange portion of the head 148. A portion of the conductor 132 may or may not directly contact the bonding lug 120. If a portion of the conductor 132 does not directly contact the bonding lug 120 the conductor 132 can be electrically coupled to the bonding lug 120 via indirect contact (i.e., through the fastener 108 and/or the fastener 136). In other embodiments the conductor 132 can be electrically coupled to the bonding lug 120 through a conductor (not shown) that is electrically coupled to the conductor 132 and electrically coupled to the bonding lug 120.

FIGS. 6A and 6B illustrate a bonding lug apparatus 300 that is a third embodiment of the invention. Elements in common with the apparatus 100 have the same reference numerals. The bonding lug 120 includes a pair of spaced tabs 120c and 120d formed and extending upwardly (in FIGS. 6A and 6B) in the direction of the head 112. The illustrated tabs 120c and 120d are formed normal to the primary plane of the bonding lug 120 and only extend along a portion of the length of the bonding lug 120. A surface 160 of each tab 120c and 120d act as the structure that prevents the conductor 132 from moving out from under the head 112. The head 148 may act as the second structure (discussed above) if the spacing between the head 148 and the shaft 116 is substantially similar to the diameter of the conductor 152 (i.e., the outside diameter of the conductor 152 rests against the head 148 when captured between the head 112 and the bonding lug 120). FIG. 6B illustrates the apparatus 300 electrically coupled to the conductor 132. As discussed above, the apparatus 300 may be electrically coupled to the conductor 132 and/or the conductor 152.

FIGS. 7A and 7B illustrate a bonding lug apparatus 400 that is a fourth embodiment of the invention. Elements in common with the apparatus 100 have the same reference numerals. The bonding lug 120 includes an arched tab 120e formed and extending upwardly (in FIGS. 7A and 7B) in the direction of the head 112. The illustrated tab 120e is formed such that an arched surface 164 of the tab 120e is normal to the primary plane of the bonding lug 120. The arched surface 164 acts as the structure that prevents the conductor 132 from moving out from under the head 112. The head 148 may act as the second structure (discussed above) if the spacing between the head 148 and the shaft 116 is substantially similar to the diameter of the conductor 152. FIG. 7B illustrates the apparatus 400 electrically coupled to the conductor 132. As discussed above, the apparatus 400 may be electrically coupled to the conductor 132 and/or the conductor 152.

FIGS. 8A and 8B illustrate a bonding lug apparatus 500 that is a fifth embodiment of the invention. Elements in common with the apparatus 100 have the same reference numerals. The bonding lug 120 includes a pair of spaced tabs 120f and 120g formed and extending upwardly (in FIGS. 8A and 8B) in the direction of the head 112. The illustrated tabs 120f and 120g are formed normal to the primary plane of the bonding lug 120. Each tab includes a half-round cutout 168. The half-round cutouts 168 act as the structure that prevents the conductor 132 from moving out from under the head 112. The head 148 of the fastener 136 may act in conjunction with the half-round cutouts 168 if the spacing between the head 148 and the shaft 116 is substantially similar to the diameter of the conductor 152. FIG. 8B illustrates the apparatus 500 electrically coupled to the conductor 132.

FIGS. 9A and 9B illustrate a bonding lug apparatus 600 that is a sixth embodiment of the invention. Elements in common with the apparatus 100 have the same reference numerals. The bonding lug 120 includes a tab 120h formed and extending upwardly in the direction of the head and angularly away from the axis of the fastener 108 (in FIGS. 9A and 9B). The illustrated tab 120h is formed such that a surface 172 of the tab 120h acts as the structure that prevents the conductor 132 from moving out from under the head 112. The surface 172 may include a portion 176 that is angled with respect to the surface 172 to further prevent the conductor 132 from moving out from under the head 112. The tab 120h may include ribs 178 to increase the rigidity of the tab 120h. The head 148 of the fastener 136 may act as the second structure (discussed above) if the spacing between the head 148 and the shaft 116 is substantially similar to the diameter of the conductor 152. FIG. 9B illustrates the apparatus 600 electrically coupled to the conductor 132. As discussed above, the apparatus 600 may be electrically coupled to the conductor 132 and/or the conductor 152.

Figure 10B:
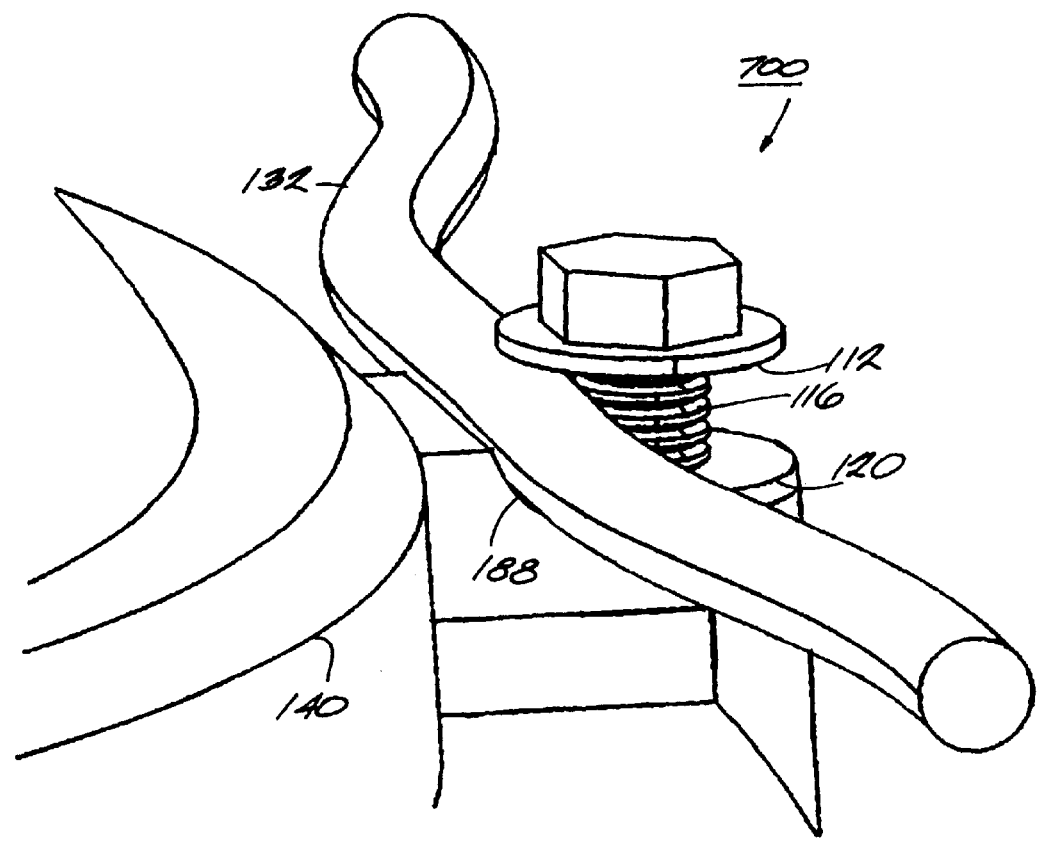
FIG. 10B illustrates the bonding lug apparatus of FIG. 10A electrically coupled to a bonding conductor.

FIGS. 10A and 10B illustrate a bonding lug apparatus 700 that is a seventh embodiment of the invention. Elements in common with the apparatus 100 have the same reference numerals. The bonding lug 120 includes a protrusion 180. The protrusion 180 generally provides a more reliable electrical coupling between the bonding lug 120 and the housing 140 because the amount of direct contact surface area is increased. An aperture 184 on the housing 140 includes a portion that frictionally receives the protrusion 180 to form the direct contact and a portion that receives the shaft 116.

The housing 140 includes a stepped portion 188 that acts as the structure that prevents the conductor 132 from moving out from under the head 112. The housing 140 also includes surfaces 192 that act as the structure discussed above that prevents rotation of the bonding lug 120 on the housing 140.

Figure 11A:
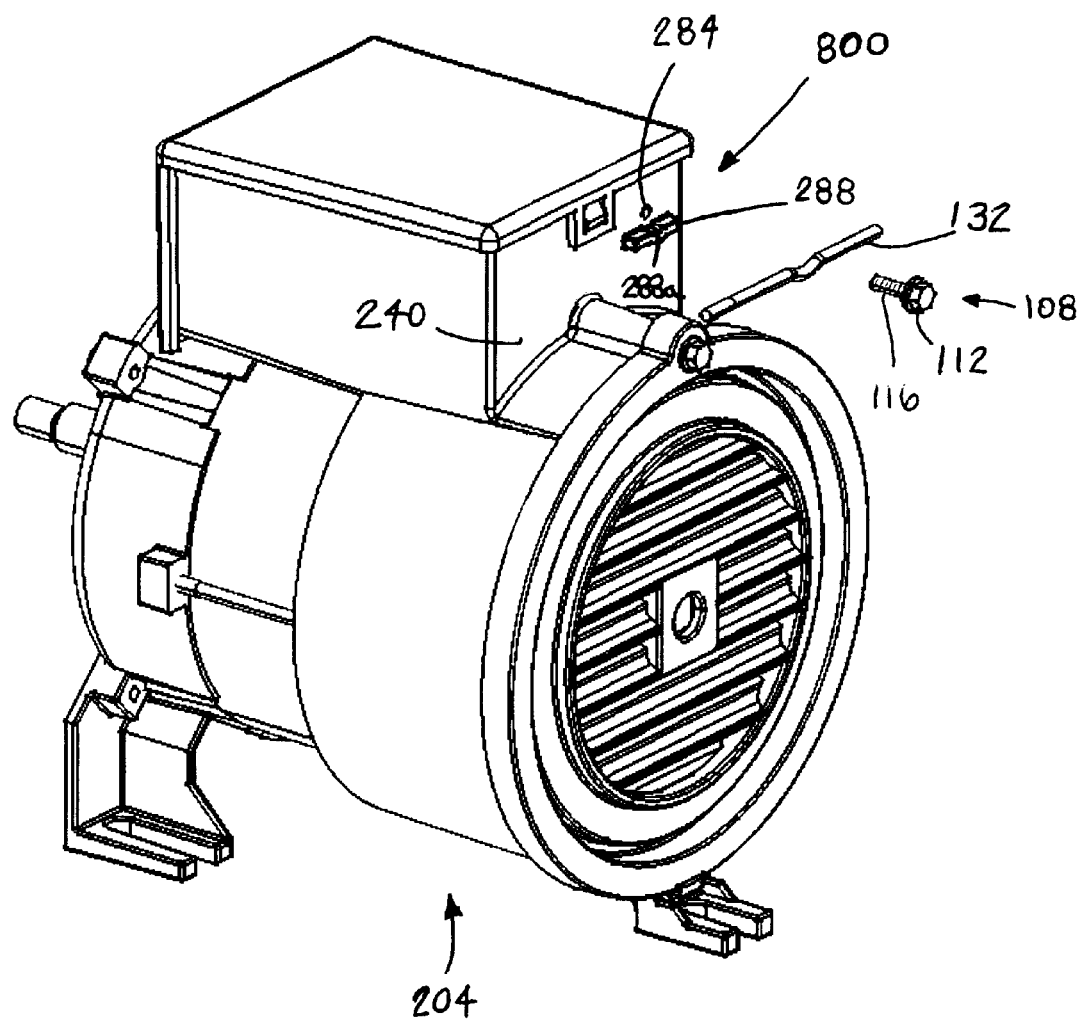
FIG. 11A illustrates an electric motor housing having an integrally formed bonding apparatus that is an eighth embodiment of the invention.
Figure 11B:
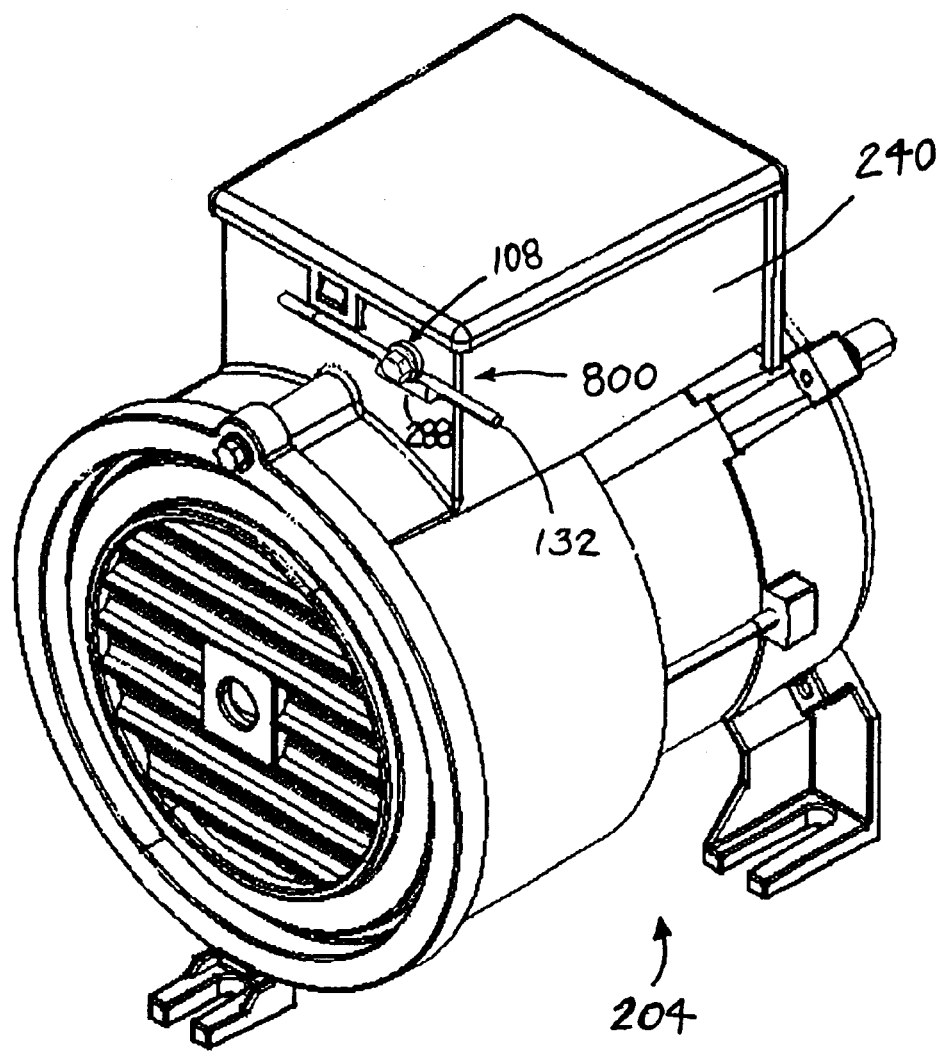
FIG. 11B illustrates a bonding conductor electrically coupled to the integrally formed bonding apparatus of FIG. 11A.

FIGS. 11A and 11B illustrate an integrally formed bonding apparatus 800 that is an eighth embodiment of the invention. FIGS. 12A and 12B illustrate an integrally formed bonding apparatus 900 that is a ninth embodiment of the invention. FIGS. 13A and 13B illustrate an integrally formed bonding apparatus 1000 that is a tenth embodiment of the invention. Elements in common with the apparatus 100 have the same reference numerals. Each integrally formed bonding apparatus 800, 900, 1000 is formed in the housing 240, 340, 440 of a representative electric motor 204, 304, 404. The housing 240, 340, 440 may be similar to the housing 140 and include a sheet metal main frame, a sheet metal base, a first aluminum end frame, and a second aluminum end frame. It should be understood that the integrally formed bonding apparatus 800, 900, 1000 are capable of use on other devices and the motors 204, 304, 404 are merely shown and described as three examples of such devices. The illustrated motors 204, 304, 404 are drivingly connected to pumps (not shown) utilized to recirculate water in hydro-massage tubs (not shown).

Each integrally formed bonding apparatus 800, 900, 1000 includes an aperture 284, 384, 484 and a structure 288, 388, 488. As illustrated in FIG. 13A, the integrally formed bonding apparatus 1000 includes two apertures 484 and three structures 488. The apertures 284, 384, 484 are adapted to receive a fastener 108. The interaction between the fastener 108 and each aperture 284, 384, 484 is similar to the interaction between the fastener 108 and the apertures configured to receive the fastener 108 discussed above with respect to the apparatus 100.

A bonding conductor 132 is captured between the head 112 and the housing 240, 340, 440 when the fastener 108 is received in the aperture 284, 384, 484. Capturing the conductor 132 between the head 112 and the housing 240, 340, 440 does not necessitate the conductor 132 be captured directly between the head 112 and the housing 240, 340, 440. Other materials (e.g., electrically conductive materials)

may be captured between the conductor 132 and the head 112 and/or the conductor 132 and the housing 240, 340, 440 without interfering with the design of the invention. In most embodiments, the conductor 132 is captured between the head 112 and the housing 240, 340, 440 without the use of a bonding lug (e.g., a copper or copper alloy bonding lug). The conductor 132 may be directly or indirectly electrically coupled to the housing 240, 340, 440. In most embodiments, the housing 240, 340, 440 is formed of an electrically conductive material. Each illustrated housing 240, 340, 440 is formed of aluminum.

The structure 288, 388, 488 includes a surface that prevents the conductor 132 from moving out from under the head 112. The structure 288, 388, 488 is integrally formed in the housing 240, 340, 440. In other embodiments, the surface that prevents the conductor 132 from moving out from under the head 112 may be part of the housing 240, 340, 440 and not part of a specific structure integrally formed in the housing. The structure 288, 388, 488 may include any number of sub-structures. The illustrated structure 288 includes a containment rib 288 spaced from and extending substantially tangential to the aperture 284. The height of the containment rib 288 is similar to the diameter of the conductor 132. The containment rib 288 includes a recess portion 288a. The containment rib 288 is spaced from the aperture 284 so the conductor 132 cannot move out from under the head 112 when the conductor is bonded to the motor 204. The illustrated structure 388 includes a stepped portion 388 similar to the stepped portion 188 illustrated in FIGS. 10A and 10B. The stepped portion 388 is shaped to receive a portion of the conductor 132. The stepped portion 388 is spaced from the aperture 384 so the conductor cannot move out from under the head 112 when the conductor is bonded to the motor 304. The illustrated structures 488 includes a containment rib 488 spaced from and extending substantially tangential to at least one respective aperture 484. The height of each containment rib 488 is similar to the diameter of the conductor 132. The containment ribs 488 are spaced from the apertures 484 so the conductor 132 cannot move out from under the head 112 when the conductor is bonded to the motor 404. The center containment rib 488 includes two surfaces that prevent a conductor 132 from moving out from under the head 112 of a fastener 108 when received in an aperture 484.

In some embodiments, the structure may be shaped similar to the structures (e.g., 120a, 120b, 120c, 120d, 120e, 120f, 120g, 120h) discussed above with respect to the bonding lug apparatus 100, 300, 400, 500, 600. In other embodiments, the structure 288, 388 may include any shape and/or any number of sub-structures.

Similar to the bonding lug apparatus 100 illustrated in FIG. 4C, the bonding apparatus 800, 900, 1000 may be electrically coupled to more than one conductor 132. For such embodiments, multiple structures or structures having multiple surfaces may be utilized to prevent each conductor 132 from moving out from under the head 112. The bonding apparatus 1000 is illustrated in FIG. 13B electrically coupled to four bonding conductors 132. In one embodiment, the multiple bonding locations of the bonding apparatus 1000 are used simultaneously. In other embodiments, the multiple bonding locations of the bonding apparatus 1000 are used to provide different configurations for bonding one, two, or three bonding conductors 132.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. A method of bonding an electric motor in a bonding area to other conductive material in the bonding area without using a bonding lug, the method comprising:

providing an electric motor having a housing, the housing having an electrically conductive portion that defines an aperture and includes an integrally formed surface adjacent the aperture;

providing a bonding conductor;

providing a fastener including a shaft and a head wider than the shaft so as to define a shoulder extending outwardly from the shaft;

inserting the fastener into the aperture in the housing so as to capture the bonding conductor between the shoulder and the housing such that the bonding conductor is electrically coupled to the housing, the integrally formed surface preventing the bonding conductor from moving out from under the shoulder of the fastener; and electrically coupling the bonding conductor to the other conductive material.

2. A method as claimed in claim 1, wherein the housing is constructed of an electrically conductive material.

3. A method as claimed in claim 1, wherein the housing is constructed of aluminum.

4. A method as claimed in claim 1, wherein the electric motor in the bonding area is bonded to the other conductive material in the bonding area without using a copper or a copper alloy bonding lug.

5. A method as claimed in claim 1, wherein the act of providing an electric motor includes providing an electric motor having a housing that defines a first aperture, a second aperture, first and second integrally formed surfaces adjacent the first aperture, and third and fourth integrally formed surfaces adjacent the second aperture; and wherein the act of inserting the fastener into the aperture includes inserting the fastener into one of the first and second apertures in the housing so as to capture the bonding conductor between the shoulder and the housing such that the bonding conductor is electrically coupled to the housing, at least one of the first, second, third, and fourth integrally formed surfaces preventing the bonding conductor from moving out from under the shoulder of the fastener.

6. A method as claimed in claim 1, wherein the surface is shaped substantially similar to at least a portion of an outer surface of the bonding conductor.

7. A method as claimed in claim 1, wherein the housing includes an integrally formed structure that defines the surface.

8. A method as claimed in claim 7, wherein the structure includes an integrally formed containment rib.

9. A method as claimed in claim 7, wherein the structure includes an integrally formed stepped portion.

10. A method as claimed in claim 7, wherein the structure includes a pair of spaced tabs.

11. A method as claimed in claim 7, wherein the structure includes an arched tab.

12. A method as claimed in claim 1, wherein the bonding conductor is in direct contact with the housing.

13. A method as claimed in claim 1, wherein the head is a hex head.

14. A method as claimed in claim 1, and further comprising:

providing a second bonding conductor;

inserting the fastener into the aperture in the housing so as to capture the second bonding conductor between the shoulder and the housing such that the second bonding conductor is electrically coupled to the housing;

electrically coupling the second bonding conductor to the other conductive material; and preventing the second bonding conductor from moving out from under the shoulder of the fastener.

15. A method as claimed in claim 14, wherein the surface prevents the second bonding conductor from moving out from under the shoulder of the fastener.

16. A method as claimed in claim 14, wherein the electric motor includes a second integrally formed surface adjacent the aperture, and wherein the second integrally formed surface prevents the second bonding conductor from moving out from under the shoulder of the fastener.

17. A method as claimed in claim 1, wherein the bonding conductor is captured between the shoulder and the housing without wrapping the bonding conductor around the fastener.

18. A method of bonding an electric motor in a bonding area to other conductive material in the bonding area without using a copper or a copper alloy bonding lug, the method comprising:

providing an electric motor having a housing, the housing having an electrically conductive portion that defines an aperture and includes an integrally formed structure, the integrally formed structure defining a surface adjacent the aperture;

providing a bonding conductor;

providing a fastener including a shaft and a head wider than the shaft so as to define a shoulder extending outwardly from the shaft;

inserting the fastener into the aperture in the housing so as to capture the bonding conductor between the shoulder and the housing such that the bonding conductor is electrically coupled to the housing, the surface of the integrally formed structure preventing the bonding conductor from moving out from under the shoulder of the fastener; and electrically coupling the bonding conductor to the other conductive material.

19. A method of bonding an electric motor in a bonding area to other conductive material in the bonding area without using a copper or a copper alloy bonding lug, the method comprising:

providing a bonding conductor, the bonding conductor having a diameter;

providing an electric motor having a housing, the housing having an electrically conductive portion that defines an aperture and includes an integrally formed containment rib, a surface of the integrally formed containment rib being spaced from the aperture by a distance substantially equal to the diameter;

providing a fastener including a shaft and a head wider than the shaft so as to define a shoulder extending outwardly from the shaft;

inserting the fastener into the aperture in the housing so as to capture the bonding conductor between the shoulder and the housing such that the bonding conductor is electrically coupled to the housing, the surface of the integrally formed containment rib preventing the bonding conductor from moving out from under the shoulder of the fastener; and electrically coupling the bonding conductor to the other conductive material.

20. A method as claimed in claim 19, wherein the containment rib defines a height, the height being substantially equal to the diameter.

* * * * *